(12) United States Patent
Tsutsumi

(10) Patent No.: US 8,355,151 B2
(45) Date of Patent: Jan. 15, 2013

(54) IMAGE PROCESSING APPARATUS AND METHOD FOR CONTROLLING PROVISIONAL RESERVATION

(75) Inventor: Kensuke Tsutsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1128 days.

(21) Appl. No.: 12/237,705

(22) Filed: Sep. 25, 2008

(65) Prior Publication Data

US 2009/0080022 A1  Mar. 26, 2009

(30) Foreign Application Priority Data

Sep. 26, 2007  (JP) .................................. 2007-249721

(51) Int. Cl.
*G06F 3/12* (2006.01)
*G06K 15/00* (2006.01)
*G06F 9/46* (2006.01)
*G06F 7/04* (2006.01)

(52) U.S. Cl. ..................... 358/1.15; 358/1.13; 358/1.14; 718/100; 726/26

(58) Field of Classification Search ................. 358/1.15, 358/1.14, 1.13; 718/100; 726/26
See application file for complete search history.

(56) References Cited

U.S. PATENT DOCUMENTS

| 6,785,727 | B1 | 8/2004 | Yamazaki |
| 6,952,780 | B2 * | 10/2005 | Olsen et al. ..................... 726/26 |
| 7,084,997 | B2 * | 8/2006 | Clough ........................ 358/1.15 |
| 2002/0083114 | A1 * | 6/2002 | Mazzagatte et al. .......... 709/100 |
| 2006/0039029 | A1 * | 2/2006 | Yagita ........................... 358/1.15 |

FOREIGN PATENT DOCUMENTS

JP   2000-242460 A   9/2000
JP   2005-174122     6/2005

* cited by examiner

*Primary Examiner* — Steven Kau
*Assistant Examiner* — Neil R McLean
(74) *Attorney, Agent, or Firm* — Canon USA, Inc., IP Division

(57) ABSTRACT

A print-request controlling unit requests a print-reservation executing unit to execute provisional reservation of a print job and requests a server communicatable over a network to print a document if the result of the provisional reservation in response to the request received from the print-reservation executing unit indicates that the print job has been provisionally reserved. The print-reservation executing unit receives the request to execute the provisional reservation from the print-request controlling unit, provisionally reserves the print job in response to the received request to execute the provisional reservation, and notifies the print-request controlling unit of the result of the provisional reservation indicating that the print job has been provisionally reserved when the print job is provisionally reserved.

13 Claims, 20 Drawing Sheets

IMAGE PROCESSING APPARATUS AND METHOD FOR CONTROLLING PROVISIONAL RESERVATION

BACKGROUND OF THE INVENTION

1. Field of the Invention

The present invention relates to an image processing apparatus and a method for controlling provisional reservation.

2. Description of the Related Art

Technologies for reserving printers in a state where no job occurs in order to rapidly produce desired printout are known (for example, refer to Japanese Patent Laid-Open No. 2000-242460).

According to the technology disclosed in Japanese Patent Laid-Open No. 2000-242460, a user can set a reservation time for a print device regardless of the presence of jobs. Japanese Patent Laid-Open No. 2000-242460 also discloses processing of jobs by priority within a reservation time and a method of selecting a document after a reservation time is set for a print device.

In addition, methods of preventing interruption of jobs to observe print orders are known (for example, refer to Japanese Patent Laid-Open No. 2005-174122). According to the method disclosed Japanese Patent Laid-Open No. 2005-174122, the interruption of jobs can be prevented to observe a print order by performing grouping of multiple jobs and managing the jobs as job groups.

Printing over a network has a problem in that leak of information can occur because of printouts that are left. Accordingly, printing systems are desired in which printouts are certainly acquired by users who have instructed the printing.

One solution to the above problem is a printing system called a pull print system. In the pull print system, clients upload print data to servers and actual print instructions are submitted with print devices. Accordingly, the pull print system has the advantage of suppression of printouts that are left by users.

However, large-scale pull print systems have challenges to the interruption of jobs and the print order.

Since a lager number of jobs is processed in the large-scale pull print systems, the load on the servers is possibly increased. As a result, it takes long time to perform server processing after users submit pull print instructions before print scheduling instructions are transmitted to print devices and, therefore, the processing can be interrupted by other jobs for printing. In such cases, the other jobs are first printed despite the fact that the users search for free devices to perform the pull printing, thus offsetting the advantages of the pull printing.

Cluster configuration in which load balancing between multiple servers is performed is generally adopted in the large-scale pull print systems. Accordingly, even if pull print instructions from users are received with one print device, the same processing path is not necessarily followed. Since higher-load processing paths or lower-load processing paths exist depending on the processing situations in the servers, the print order can be changed after the pull print instructions are received before the print scheduling instructions are transmitted to print devices and the print order may not be observed.

In the prevention of the interruption of jobs by the method disclosed in Japanese Patent Laid-Open No. 2000-2424460, priority is given to the jobs of reservers within reserved time periods and other jobs can be interrupted and divided. In addition, it is necessary for users to set the reservation times of printers before performing the pull printing. Furthermore, prolonging the reservation times can occupy the printers for long times to reduce the convenience of other users.

With the method disclosed in Japanese Patent Laid-Open No. 2005-174122, managing multiple continuous jobs as group jobs can prevent interruption of other jobs into the multiple jobs and allows the print order of the grouped jobs to be observed. However, it is not possible to resolve the problems of the interruption of jobs and the print order, which are described above as challenges and which are caused by the fact that it takes long time to perform the processing after users submit the pull print instructions before the print scheduling instructions are transmitted to print devices.

SUMMARY OF THE INVENTION

Perform printing in a specified order without being interrupted by another job while a job concerning pull print is being processed.

According to an embodiment of the present invention, an image processing apparatus includes a print-request controlling unit configured to request a server with which the image processing apparatus can communicate over a network to print a document stored in an apparatus with which the image processing apparatus can communicate over a network; and a print-reservation executing unit configured to execute reservation of a print job in response to a request to execute the reservation of the print job transmitted from the server. The print-request controlling unit requests the print-reservation executing unit to execute provisional reservation of a print job and requests the server to print the document if the result of the provisional reservation in response to the request received from the print-reservation executing unit indicates that the print job has been provisionally reserved. The print-reservation executing unit receives the request to execute the provisional reservation from the print-request controlling unit, provisionally reserves the print job in response to the received request to execute the provisional reservation, and notifies the print-request controlling unit of the result of the provisional reservation indicating that the print job has been provisionally reserved when the print job is provisionally reserved.

According to another embodiment of the present invention, a method for controlling provisional reservation of a print job in an image processing apparatus including a print-request controlling unit and a print-reservation executing unit includes requesting a server with which the image processing apparatus can communicate over a network to print a document stored in an apparatus with which the image processing apparatus can communicate over a network by the print-request controlling unit; and executing reservation of a print job in response to a request to execute the reservation of the print job transmitted from the server by the print-reservation executing unit. The requesting requests the print-reservation executing unit to execute provisional reservation of a print job and requests the server to print the document if the result of the provisional reservation in response to the request received from the print-reservation executing unit indicates that the print job has been provisionally reserved. The executing receives the request to execute the provisional reservation from the print-request controlling unit, provisionally reserves the print job in response to the received request to execute the provisional reservation, and notifies the print-request controlling unit of the result of the provisional reservation indicating that the print job has been provisionally reserved when the print job is provisionally reserved.

According to another embodiment of the present invention, computer-executable instructions encoded in a computer-readable storage medium may be provided.

According to an aspect of the present invention, it is possible to perform the printing in a specified order without being interrupted by another job while a job concerning the pull print is being processed.

Further features and aspects of the present invention will become apparent from the following description of exemplary embodiments with reference to the attached drawings.

DESCRIPTION OF THE EMBODIMENTS

Embodiments of the present invention will herein be described in detail with reference to the attached drawings.

First Exemplary Embodiment

Figure 1:
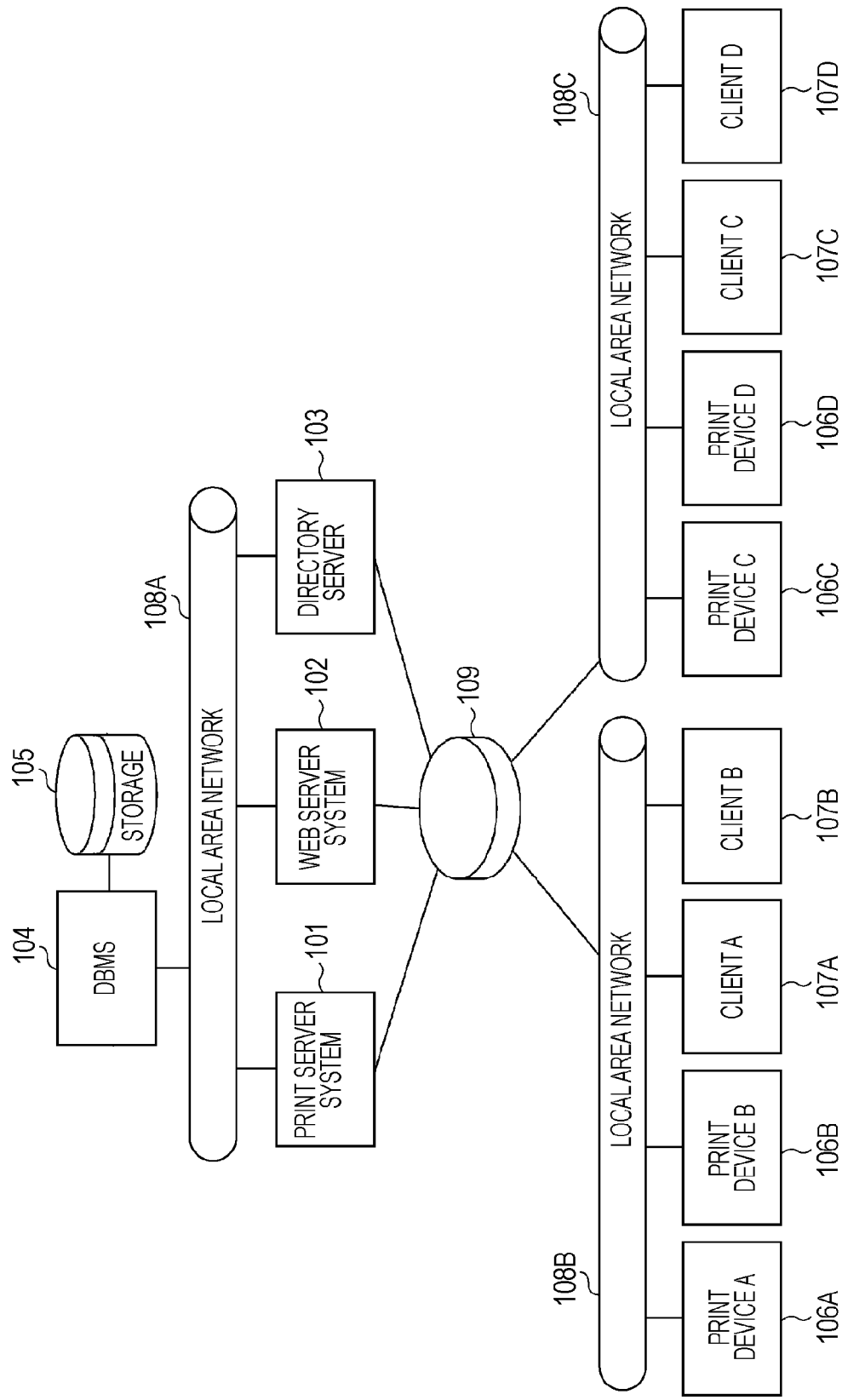
FIG. 1 is a block diagram showing an example of the configuration of a printing system.

FIG. 1 is a block diagram showing an example of the configuration of a printing system. In the printing system, server systems, etc. controlling the printing system, print devices, and clients (client computers) are widely connected to each other via a wide area network (hereinafter referred to as a WAN) 109.

Referring to FIG. 1, a database management system (DBMS) 104 manages data including document data, print jobs, printer information stored in a storage 105. The DBMS 104 is software installed in a server computer or the like and the central processing unit (CPU) in the server computer performs processing based on the DBMS 104. However, it is assumed that the DBMS 104 performs the processing in the present embodiment for simplicity. The DBMS 104 receives, for example, an update, acquisition, addition, or deletion operation of a variety of data from another server and performs the processing in accordance with the received operation.

The storage 105 may be directly connected to the DBMS 104 as a direct attached storage (DAS) or may be connected to the DBMS 104 over a storage area network (SAN). In a large-scale printing system, the DBMS 104 (or the server computer in which the DBMS 104 is installed) may have a cluster configuration or a redundant configuration in preparation for an occurrence of failure for load balancing.

A print server system 101 includes server computers that monitor and manage the print devices in the printing system, control and monitor print jobs, and transfer the print jobs to the print devices. In a large-scale printing system, also the print server system 101 may have a cluster configuration or may have a redundant configuration in preparation for an occurrence of failure for the load balancing.

The print server system 101 is connected to the DBMS 104 and a Web server system 102 via a local area network (hereinafter referred to as a LAN) 108A to exchange print job data, print control instructions, and information concerning print jobs which the print server system 101 manages with the DBMS 104 and the Web server system 102.

The Web server system 102 transmits information concerning the print jobs managed by the print server system 101 and information concerning documents managed by the DBMS 104 to each client 107, which is a front end connected to the Web server system 102 via the WAN 109. The Web server system 102 includes Web server computers and may have a cluster configuration or a redundant configuration in preparation for an occurrence of failure for the load balancing.

The Web server system 102 receives a print instruction or an operation of a print job from the client 107 or each print device 106 and transmits an instruction to the print server system 101. The Web server system 102 also manages authentication of login from the client 107 or the print device 106 in cooperation with a directory server 103 described below. The Web server system 102 holds information about the rights of users, set in advance by a system designer or a document creator. The right information includes information about reference, print, and deletion rights of a document, a print right with one printer, and a deletion right of a print job. The information about the rights of users may be stored and managed by the Web server system 102 or may be stored and managed by the DBMS 104.

The directory server 103 is a server computer that manages authentication of users by using, for example, combinations of the user names and passwords. Each user may participate in a domain group. For example, the Web server system 102 and the DBMS 104 may set the rights of the domain groups in domain-group right information in a range different from that of the user rights. The Web server system 102 may set user information or group information so that each user can participate in multiple domain groups.

Each of a print device A 106A, a print device B 106B, a print device C 106C, and a print device D 106D (hereinafter referred to as a print device 106) is connected to a LAN 108B or a LAN 108C via a network interface (not shown). The LAN 108B and the LAN 108C are connected to the WAN 109, and the print device 106 can communicate with the print server system 101 or the Web server system 102 via the LAN 108B or the LAN 108C and the WAN 109. An image processing apparatus, such as a laser beam printer adopting electrophotography or an inkjet printer, can be appropriately applied to the print device 106. The print device 106 includes a schedule application 601 (print-reservation executing unit) managing a printing schedule and a pull print application 602 (print-request controlling unit) issuing a print instruction with the print device. The schedule application 601 and the pull print application 602 will be described below. The print device 106 also includes an authentication application 603 that associates a login to the print device 106 with a login to the Web server system 102. An information input device used for login to the print device 106 is connected to the print device 106 so as to be communicatable with the print device 106.

Each of a client A 107A, a client B 107B, a client C 107C, and a client D 107D (hereinafter referred to as a client 107) is a client computer performing information processing. The client 107 is connected to the LAN 108B or the LAN 108C over a network (not shown). The LAN 108B and the LAN 108C are connected to the WAN 109, and the client 107 can communicate with various server systems via the LAN 108B or the LAN 108C and the WAN 109. The client 107 may be a computer to which a permanent storage device is connected or a thin-client computer only including a temporary storage device.

Figure 2:
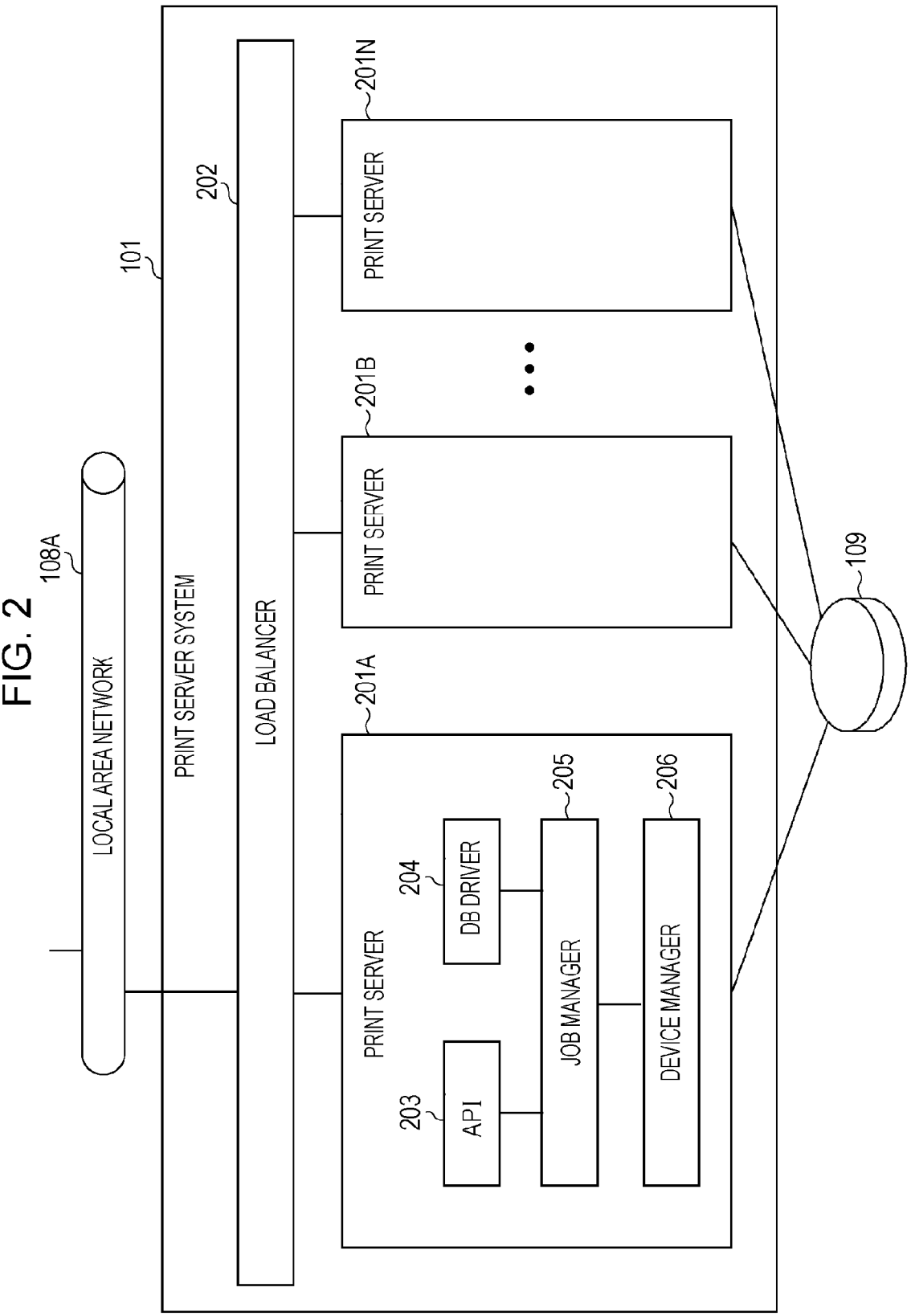
FIG. 2 is a block diagram showing an example of the configuration of a print server system.

FIG. 2 is a block diagram showing an example of the configuration of the print server system 101.

Referring to FIG. 2, in the print server system 101 according to the present embodiment, multiple print servers 201 (print server computers) are connected to each other via the LAN 108A and a load balancer 202, which is a mechanism for the load balancing. The load balancer 202 keeps track of the load situations of the multiple print servers 201 and issues a request to the print server 201 having a lighter load by priority for the load balancing. The load situations can be kept track of by, for example, a round-robin method in which requests are sequentially submitted to each print server 201 or a method of periodically transmitting a specific request to each print server 201 to determine the time before the response to the request is returned as a load.

An example of the functional configuration of the print server 201 will now be described.

The print server 201 includes an application program interface (API) 203, a database (DB) driver 204, a job manager 205, and a device manager 206 as the functional components.

The API 203 receives a request for registration of a document, a request for print of a document, or a request for control of a print job from the Web server system 102 or other servers creating printable documents. The servers creating printable documents include a form server creating forms of regular sizes and a document management server collectively managing documents of users.

The DB driver 204 is a communication module with the DBMS 104. For example, the DB driver 204 receives a request for registration of a document to register the document in the DBMS 104 or receives a print request to acquire print data from the DBMS 104.

The job manager 205 has the following functions.

Specifically, the job manager 205 registers a document received by the API 203 in the DBMS 104 through the DB driver 204. When the API 203 receives a print request, the job manager 205 acquires document data to be printed from the DBMS 104 through the DB driver 204 to manage the acquired document data as a print job.

Figure 3:
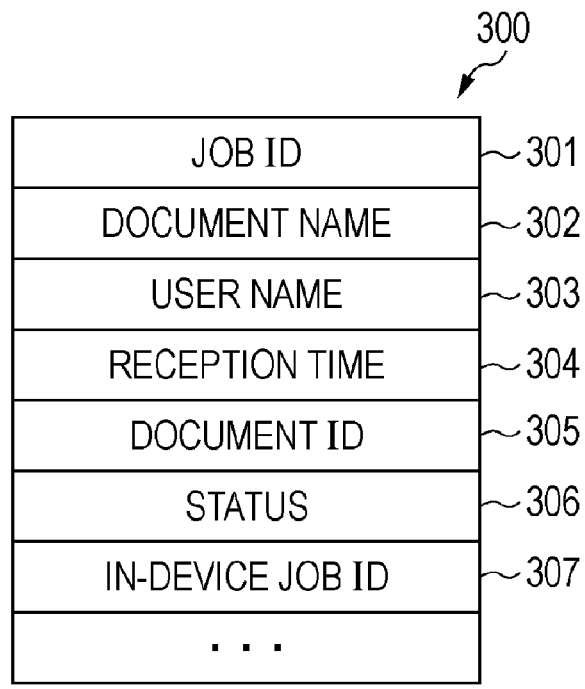
FIG. 3 shows an example of job information.

The information managed here is, for example, job information 300 shown in FIG. 3. FIG. 3 shows an example of the job information 300. The job information 300 includes a job ID 301, a document name 302, a user name 303, a reception time 304, a document ID 305, a status 306, and an in-device job ID 307. The job ID 301 is the identifier of a print job issued by the job manager 205. The user name 303 is the account name of a user who has submitted a print request. The document ID 305 is the identifier of a document managed by the DBMS 104. The status 306 indicates the status of the print job. A "wait" status indicating that the job is waiting for its print turn, a "transferring" status indicating that print data is being transferred to the print device 106, or a "printing" status indicating that printing is performed with the print device 106 is displayed as the status 306. The in-device job ID 307 is the identifier of a job issued by the schedule application 601 in the print device 106. In addition, the job manager 205 instructs the device manager 206 described below to print a document that is acquired with the print device 106 with which the document should be printed.

Figure 4:
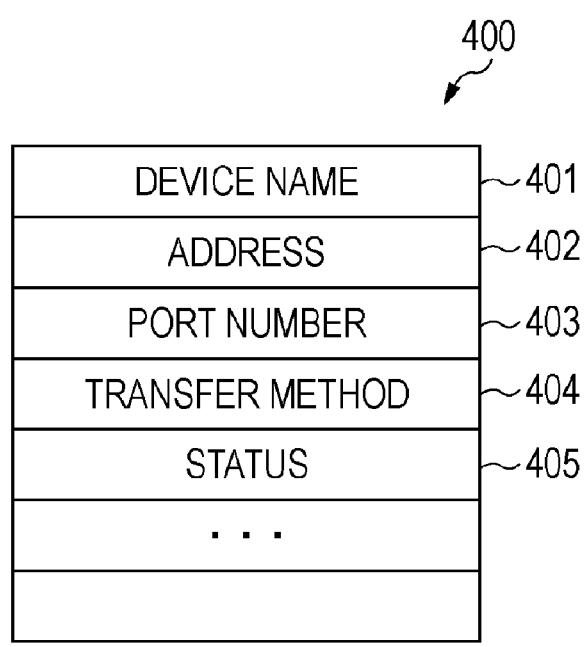
FIG. 4 shows an example of device information.

The device manager 206 manages device information 400 shown in FIG. 4 and holds a variety of information about the print device 106 to be used for the printing. FIG. 4 shows an example of the device information 400. The device information 400 includes a device name 401, a address 402 that is a destination with which the device communicates, a communication port number 403, a transfer method 404 of print data, and a status 405 of the device. The print data is transferred according to, for example, raw TCP/IP in which pieces of data are continuously transmitted as a stream according to Transmission Control Protocol/Internet Protocol (TCP/IP), Line Printer Daemon protocol (LPR), or Hypertext Transfer Protocol (HTTP). The device information 400 may be managed by the DBMS 104, instead of the device manager 206, and may be acquired via the DB driver 204, as needed. In other words, the location where the device information 400 is held is not restricted. When the device manager 206 receives a request for transmission of print data from the job manager 205, the device manager 206 starts communication with the schedule application 601 in the print device 106 to sequentially print the print data. The printing method will be described in detail below.

Figure 5:
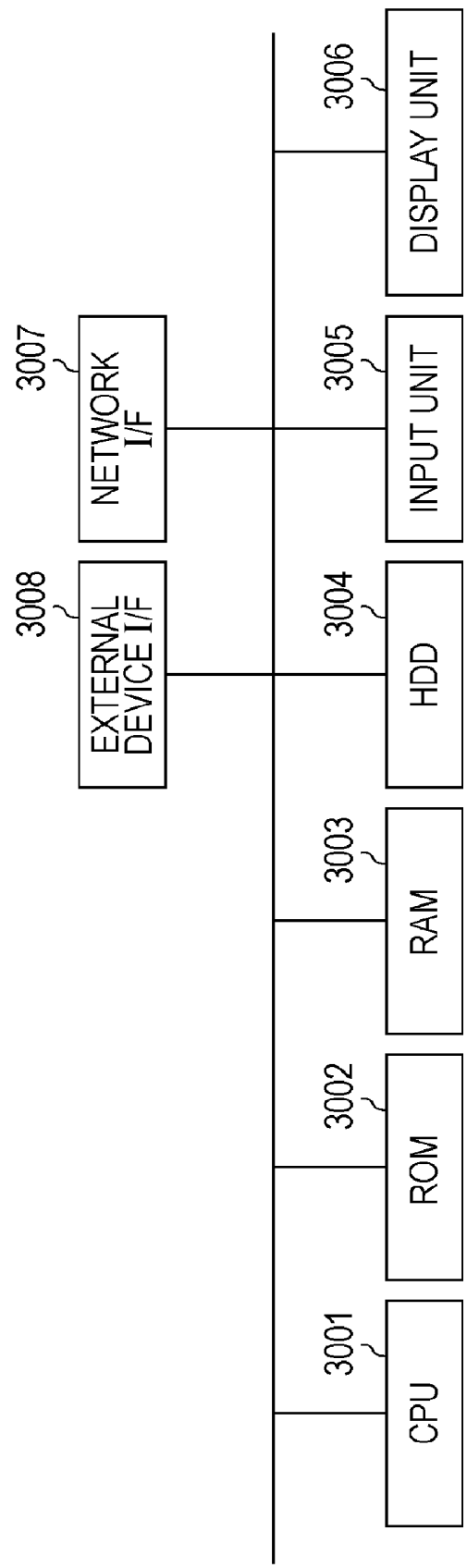
FIG. 5 is a block diagram showing an example of the hardware configuration of a server computer or a client computer.

FIG. 5 is a block diagram showing an example of the hardware configuration of a server computer or a client computer.

Referring to FIG. 5, a CPU 3001 reads programs stored in a hard disk drive (HDD) 3004 in a random access memory (RAM) 3003 and performs processing based on the programs to control each process in the apparatus (the server computer or the client computer). A read only memory (ROM) 3002 stores programs and data concerning each process in the apparatus. The ROM 3002 is a rewritable memory. The RAM 3003 electrically stores temporary data concerning each process in the apparatus. The RAM 3003 is a rewritable memory.

The programs and data, the temporary data, and so on concerning each process in the apparatus are stored in the HDD 3004. An input unit 3005 is a keyboard or a pointing device receiving an instruction to the apparatus. A display unit 3006 displays the operation status of the apparatus and information output from each program running on the apparatus. A network interface 3007 is connected to a LAN and the Internet over a network to externally exchange information. An external device interface 3008 is connected to an external storage device or the like.

Figure 6:
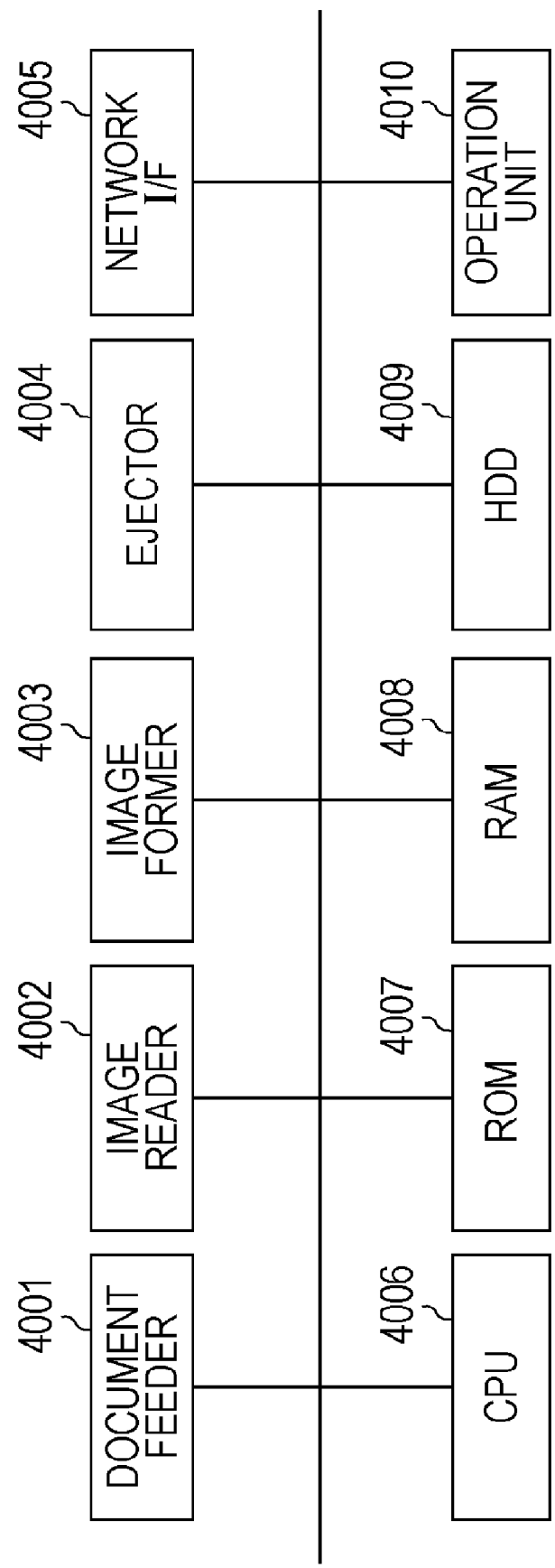
FIG. 6 is a block diagram showing an example of the hardware configuration of a print device.

FIG. 6 is a block diagram showing an example of the hardware configuration of the print device 106.

Referring to FIG. 6, an image reader 4002 reads data on a document fed from a document feeder 4001. The image reader 4002 and an image former 4003 convert a document that is read or data received over a network into a print image and prints out the print image. An ejector 4004 ejects a sheet of paper on which a print image is printed and which is output and performs processing, such as sorting and stapling. A network interface 4005 is connected to a LAN and the Internet over a network to externally exchange information. A CPU 4006 reads programs stored in a ROM 4007 or an HDD 4009 in a RAM 4008 and performs processing on the basis of the programs to control each process in the apparatus (the print device). The ROM 4007, which is a non-volatile memory, stores programs and data concerning each process in the apparatus. The rewritable RAM 4008 electrically stores temporary data concerning each process in the apparatus. The programs and data, the temporary data, and so on concerning each process in the apparatus are stored in the HDD 4009. An operation unit 4010 displays each screen described below and receives an instruction input by a user with each screen.

The Web server system 102 generally has a cluster configuration for the load balancing, as described above, and includes multiple Web server computers. The Web server installed in each Web server computer is software performing information communication in a World Wide Web (WWW) system.

The Web server system 102 has the following functions. Specifically, the Web server system 102 acquires account information about a user (the user name of the user) and a password when the user logs in from the client 107 or the print device 106, which is a front end, and causes the directory server 103 to perform authentication. If the login succeeds, the Web server system 102 authenticates a reference right to a document of the user. The Web server system 102 acquires information about the document from the DBMS 104 in accordance with the authenticated reference right and transmits the information to the client 107 or the print device 106 logged in by the user. In addition, the Web server system 102 receives an instruction to print a document from the client 107 or the print device 106 and transmits the print instruction to which a document ID is added to the print server system 101.

In the authentication of the reference right, for example, a policy is used in which the documents of the users in all the domains to which the user belong can be referred to or a policy is used in which only the documents of the user can be referred to. The policies used in the authentication of the reference right can be flexibly designed depending on the policy of the user who implements the printing system. The Web server system 102 can set a print right to a document, a delete right to a print job, a promotion right, etc., in addition to the reference right to a document.

Figure 7:
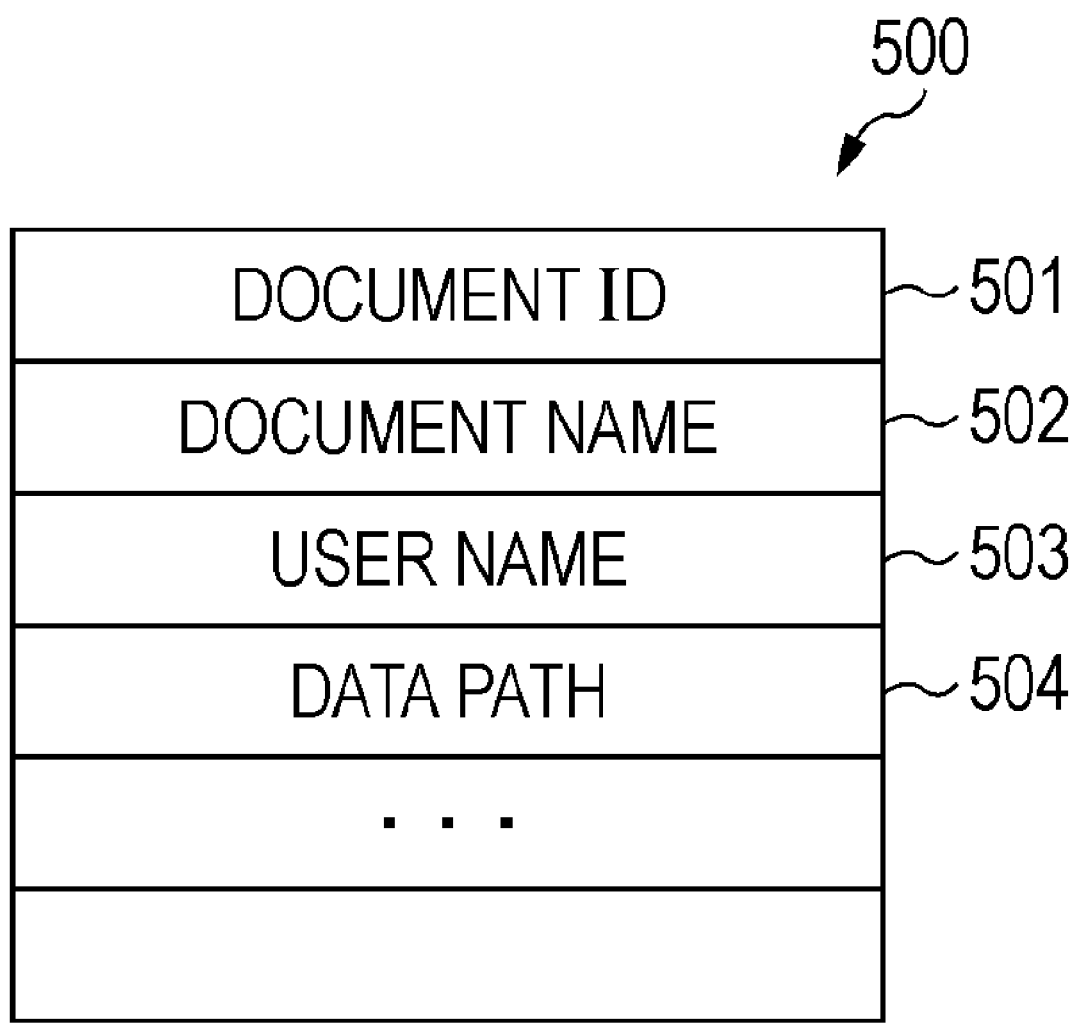
FIG. 7 shows an example of a document table.

The DBMS 104 can adopt various data management methods including a card-type data management method, a relational data management method, and an object-oriented data management method. According to the present embodiment, it is assumed that the DBMS 104 adopts the relational data management method, which is most common. The DBMS 104 holds a document table 500 as table information. FIG. 7 shows an example of the document table 500.

The document table 500 includes a document ID 501, which is the identifier of a document, a document name 502, a user name 503 indicating the name of a registrant of the document, and a data path 504 indicating the location where the document is actually stored. Although the document table 500 holds documents for reference and data is stored in other locations in the present embodiment, the data may be directly held in the document table 500.

The DBMS 104 is used, for example, in the following manner.

Specifically, the DBMS 104 may be used to acquire information about all the documents having a specified user name from the Web server system 102, to acquire information about the document having a specified document ID from the print server 201, or to register a new document supplied from the print server 201.

Figure 8:
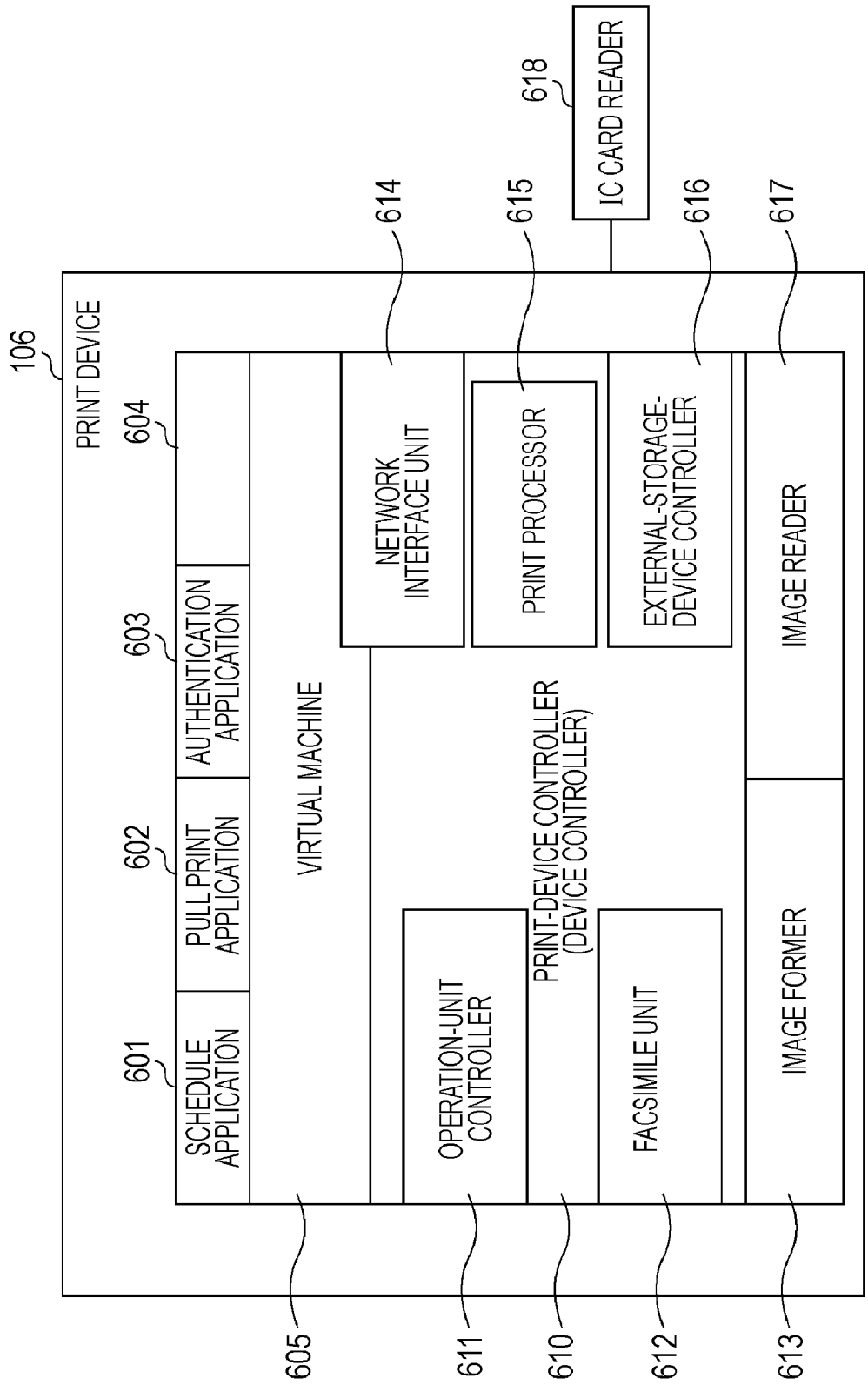
FIG. 8 schematically illustrates part of an exemplary software and hardware configuration of the print device.

FIG. 8 schematically illustrates part of an exemplary software and hardware configuration of the print device 106. Referring to FIG. 8, an image former 613 corresponds to the image former 4003 in FIG. 6. The image former 613 performs a series of image forming processes including handling of sheets of paper, image transfer, and fixing to form an image on a recording medium, such as a recording sheet. The image former 613 is provided with an image forming unit, such as an inkjet printer or an electrophotographic printer.

An image reader 617 corresponds to the image reader 4002 in FIG. 6 and is provided with a scanner and the like. The image reader 617 optically reads a document image to convert the document image into digital image information. In addition, the image reader 617 supplies the digital image information to the image former 613 to cause the image former 613 to form an image or passes the digital image information to a facsimile unit 612 or a network interface unit 614 to cause the facsimile unit 612 or the network interface unit 614 to transmit the digital image information via a line.

A print-device controller (device controller) 610 controls the operations of the image former 613 and the image reader 617. For example, the device controller 610 controls the image former 613 and the image reader 617 so that document information read out by the image reader 617 is copied by the image former 613. The device controller 610 includes the network interface unit 614, a print processor 615, the facsimile unit 612, and an operation-unit controller 611 and controls exchange of information among the components. The device controller 610 corresponds to the CPU 4006, the ROM 4007, the RAM 4008, the HDD 4009, and so on in FIG. 6.

The facsimile unit 612 transmits and receives facsimile images. Specifically, the facsimile unit 612 transmits digital image information read out by the image reader 617 or decodes a facsimile signal that is received to record the facsimile signal in the image former 613.

The operation-unit controller 611 controls the operation unit 4010 so as to generate a signal corresponding to a user's operation with an operation panel in the operation unit 4010 or to display a variety of data or messages in the operation unit 4010 (or a display unit).

The print processor 615, for example, processes print data input through the network interface unit 614 to supply the print data to the image former 613 and to print the print data.

The network interface unit 614 controls transmission and reception of data to and from another communication terminal through a communication line.

A virtual machine 605 is at a level higher than that of the device controller 610. The virtual machine 605 is configured so as to control the device controller 610.

The network interface unit 614 can be directly used from both the device controller 610 and the virtual machine 605. Accordingly, the device controller 610 and the virtual machine 605 can independently access an external network.

The applications described in a programming language corresponding to an API supplied from the virtual machine 605 exist above the virtual machine 605. These applications can indirectly access the device controller 610 via the virtual machine 605 and can operate the image former 613 and the image reader 617.

According to the present embodiment, the applications include the schedule application 601, the pull print application 602, and the authentication application 603. These applications are configured so as to be uninstalled from the virtual machine 605 or to be installed as a new application 604.

Although the applications are installed in the print device 106 in the present embodiment, the applications may be provided as hardware. Alternatively, the applications may be provided as applications on a computer connected to the print device 106 as an external device so as to be communicatable with the print device 106.

An external-storage-device controller 616 causes the image former 613 to convert an image read out by the image reader 617 into a data format that can be stored in an external storage device and stores the image resulting from the conversion in the external storage device. In addition, the external-storage-device controller 616 reads out data from the external storage device to print the data via the image former 613 or to externally transmit the data over a network through the network interface unit 614.

According to the present embodiment, an integrated circuit (IC) card reader 618 is connected as a unit used for logging in the print device 106 so as to be communicatable with the print device 106. The IC card reader 618 can be used to notify the authentication application 603 of account information about the user. The login unit is not restricted to the one described above. For example, an operation unit (device panel) managed by the operation-unit controller 611 may be used as the login unit.

Figure 9:
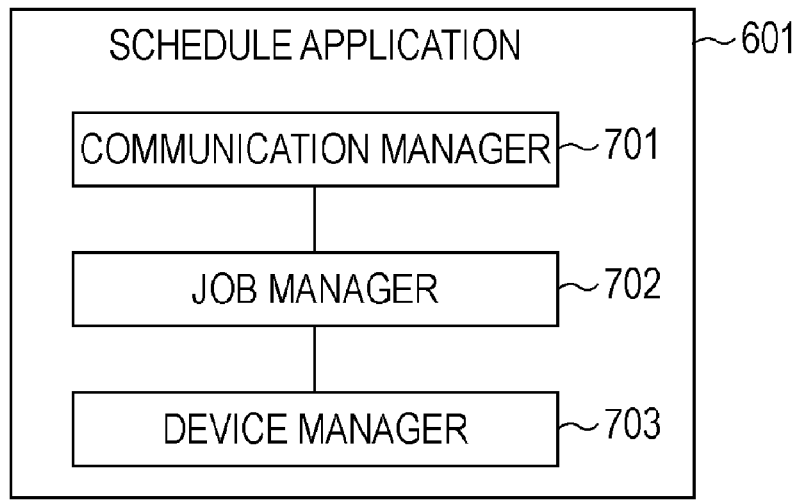
FIG. 9 is a block diagram showing an example of the functional configuration of a schedule application.

FIG. 9 is a block diagram showing an example of the functional configuration of the schedule application 601. The schedule application 601 includes a communication manager 701, a job manager 702, and a device manager 703.

The communication manager 701 is used for connection to the print server 201. The communication manager 701 receives a request from the print server 201 and indicates a variation in status of a print job indicated by the device controller 610. A print sequence will be described in detail below.

The job manager 702 is a module that performs scheduling of print jobs received from the print server 201 and manages the print jobs. The job manager 702 controls the print jobs so as to be sequentially printed according to the schedule. In addition, the job manager 702 receives deletion, promotion (change of the priority), and other operations for print jobs supplied from the print server 201 or the pull print application 602 described below to control the print jobs.

The device manager 703 is a module that communicates with the device controller 610. The device manager 703 is a driver deleting a print job or detecting a variation in the state of the print job.

Figure 10:
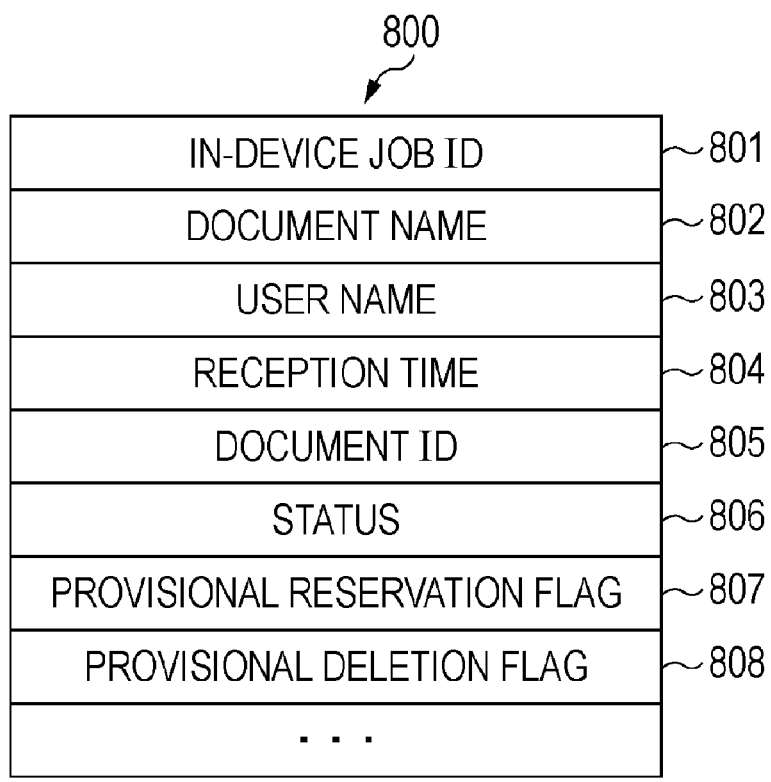
FIG. 10 shows an example of schedule information about a print job managed by a job manager.

FIG. 10 shows an example of schedule information 800 about a print job managed by the job manager 702.

The schedule information 800 includes an in-device job ID 801 of a print job, a document name 802, a user name 803, a reception time 804, a document ID 805, a status 806 of the print job, a provisional reservation flag 807, and a provisional deletion flag 808. Since the in-device job ID 801 to the status 806 in the schedule information 800 are basically common to the job ID 301 to the status 306 in the job information 300 managed by the print server 201 described above, a detailed description of them is omitted herein. The provisional reservation flag 807 is set to "true" when the print job is provisionally reserved and is set to "false" when a schedule request from the print server 201 is received. The provisional deletion flag 808 is set to "true" when deletion of a job is requested in a state where no schedule request is received from the print server 201 (when the provisional reservation flag 807 is set to "true"). In other words, if the deletion of a job is requested when the provisional reservation flag 807 is set to "true", the provisional deletion flag 808 is set to "true". The deletion of a job is performed at a time when a schedule request from the print server 201 is received.

The authentication application 603 acquires information about an IC card from the IC card reader 618 connected to the print device 106 so as to be communicatable with the print device 106 and acquires the user ID from a user management table managed by the authentication application 603. The user management table is a two-dimensional table indicating the information about the IC card and the user ID.

The authentication application 603 notifies the pull print application 602 described below of the acquired user ID. The authentication application 603 detects logout of the user and notifies the pull print application 602 of the logout of the user. The logout can be detected when a hard key provided in the print device 106 is pressed or the logout can be automatically detected when a state where the user does not operate the print device 106 continues for a predetermined time.

Figure 11:
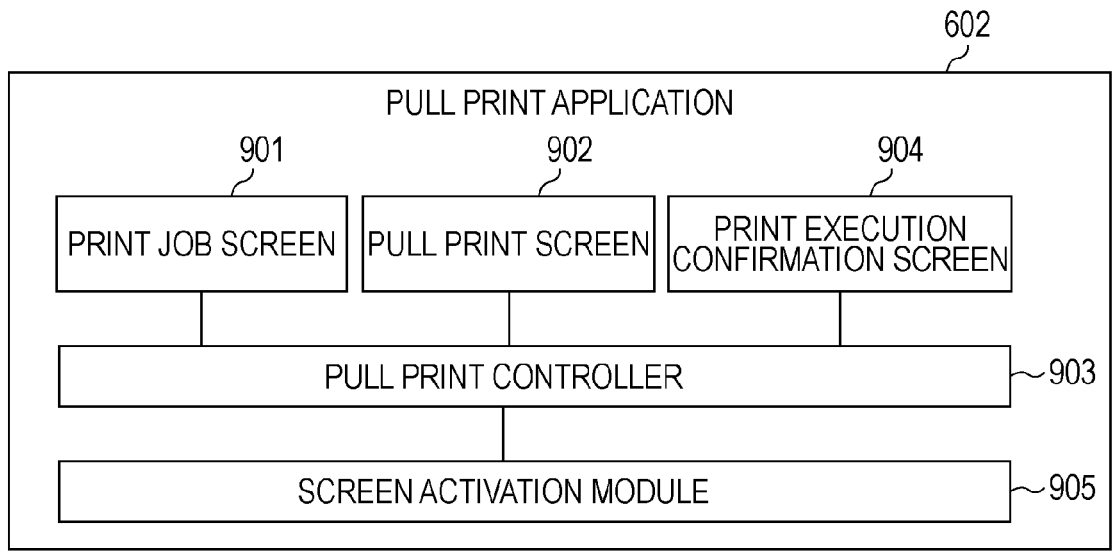
FIG. 11 is a block diagram showing an example of the functional configuration of a pull print application.

FIG. 11 is a block diagram showing an example of the functional configuration of the pull print application 602.

The pull print application 602 includes a print job screen 901, a pull print screen 902, a pull print controller 903, a print execution confirmation screen 904, and a screen activation module 905.

The screen activation module 905 receives notification of login or logout from the authentication application 603 and notifies the pull print controller 903 of the login or logout. When the pull print controller 903 receives the notification of the login, the pull print controller 903 initializes and generates the print job screen 901 and the pull print screen 902. The print job screen 901 and the pull print screen 902 will be described in detail below.

When the pull print controller 903 receives the notification of the logout, the pull print controller 903 discards the generated screens.

Figure 12:
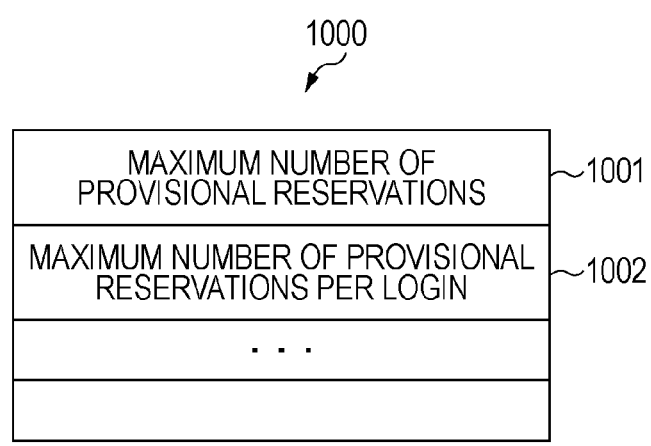
FIG. 12 shows an example of provisional-reservation restriction information for every print device.

FIG. 12 shows an example of provisional-reservation restriction information 1000 for every print device 106. The provisional-reservation restriction information 1000 includes a maximum number of provisional reservations 1001 (the number of provisional reservations allowable for the device) and a maximum number of provisional reservations per login 1002 (the number of provisional reservations allowable for each login user). The maximum number of provisional reservations 1001 is the maximum number of provisional reservations set for the print device. The maximum number of provisional reservations per login 1002 is the maximum number of provisional reservations set for each login user.

The provisional-reservation restriction information 1000 is set and registered by a specific user with a registration screen provided in the pull print application 602 or the Web server system 102. Specifically, the number of provisional reservations is restricted depending on the performance or application of the print device 106. For example, the specific user sets a larger maximum number of provisional reservations for a print device having a higher printing speed and sets a smaller maximum number of provisional reservations for a print device having a lower printing speed. The degree of occupation of the print device 106 can be adjusted in the above manner.

The provisional-reservation restriction information 1000 may be added to the device information 400 managed by the print server 201 or may be registered in the DBMS 104 to manage the provisional-reservation restriction information 1000.

The print sequence performed among the print server 201, the schedule application 601, and the device controller 610 will now be described with reference to the drawings.

Figure 13:
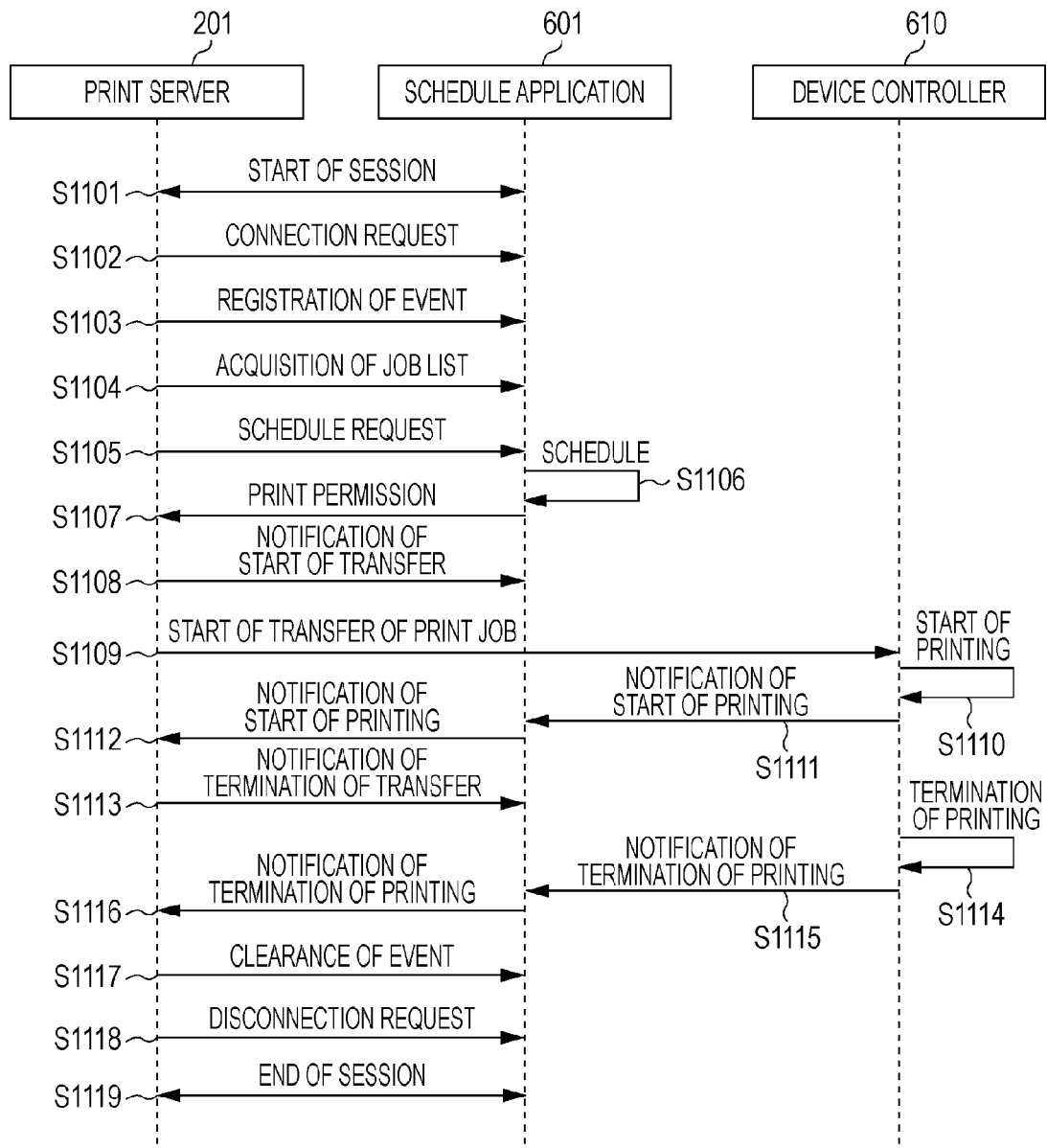
FIG. 13 shows an example of a print sequence performed among a print server, the schedule application, and a device controller.

FIG. 13 shows an example of the print sequence performed among the print server 201, the schedule application 601, and the device controller 610.

Although not shown in FIG. 13, the schedule application 601 registers an event in the device controller 610 at startup. Accordingly, when a print job managed by the device controller 610 or the state of the device is varied, the variation is indicated to the schedule application 601.

A print request indicated to the print server 201 includes a document ID and the name of a printer used for printing or the address of the printer. The job manager 205 acquires data about the document from the DBMS 104 through the DB driver 204 based on the indicated document ID. Then, the device manager 206 identifies the print device 106 used for the printing and performs the following print sequence.

In Step S1101, a communication session is started between the print server 201 and the schedule application 601. The communication session is established according to a communication protocol, such as the TCP/IP or the HTTP.

In Step S1102, the print server 201 submits a connection request to the schedule application 601. The schedule application 601 receives the connection request with the communication manager 701.

In Step S1103, the print server 201 registers an event in the schedule application 601 so that the print server 201 receives a notification when the status of the print job or the print device is varied.

In Step S1104, the print server 201 acquires a list (job list) of the schedule information 800 currently managed by the job manager 702 in the schedule application 601. The acquired list of the schedule information 800 is, for example, indicated to another application server connected to the print server 201 or supplied to a console used for managing the print server 201. Alternatively, information about the print job may be supplied to the client 107 through the Web server system 102.

In Step S1105, the print server 201 submits a request to schedule a print job (a request for execution of a reservation) to the schedule application 601. The schedule request includes the job information 300.

Figure 14:
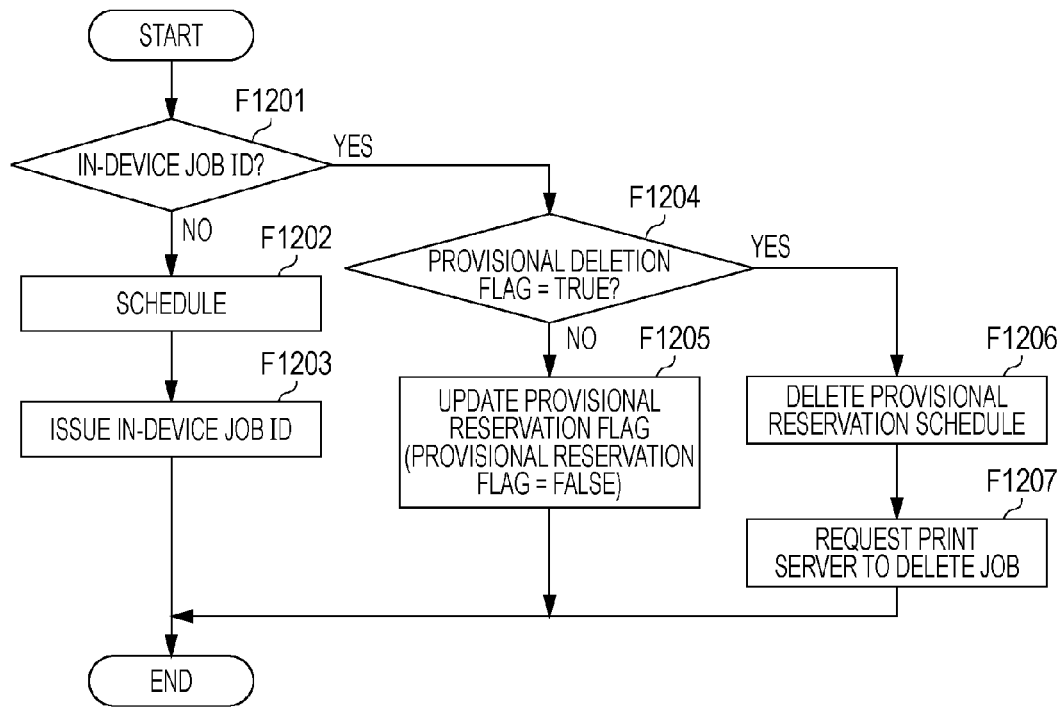
FIG. 14 is a flowchart showing an example of a schedule operation in the schedule application that has received a schedule request.

FIG. 14 is a flowchart showing an example of a schedule operation (Step S1106) in the schedule application 601 that has received the schedule request. Referring to FIG. 14, in Step F1201, the schedule application 601 determines whether the in-device job ID 307 is included in the job information 300 passed as the schedule request from the print server 201. If the in-device job ID 307 is not included in the job information 300, then in Step F1202, the schedule application 601 adds information indicating that the job is not provisionally reserved to the schedule information 800 managed by the job manager 702. In Step F1203, the schedule application 601 issues and registers an in-device job ID. The in-device job ID is indicated to the print server 201 and is stored in the job information 300.

If the in-device job ID 307 is included in the job information 300 passed as the schedule request, the print job is provisionally reserved and is subjected to scheduling. Accordingly, the job manager 702 in the schedule application 601 searches the schedule list (the list of the schedule information 800) for the target job based on the passed in-device job ID 307.

Specifically, in Step F1204, the job manager 702 determines whether the provisional deletion flag 808 in the schedule information 800 is set to "false". If the provisional deletion flag 808 in the schedule information 800 is set to "false", then in Step F1205, the job manager 702 updates the provisional reservation flag 807 to "false" to enable the printing. If the provisional deletion flag 808 in the schedule information 800 is set to "true", then in Step F1206, the job manager 702 deletes the schedule information 800. In Step F1207, the schedule application 601 requests the print server 201 to delete the job.

The job information 300 is updated or the document table 500 is deleted in the above manner.

At this time, the job manager 702 controls the print order according to order of the schedule information 800. In the control of the print order, the jobs may be sequentially printed in the registration order or the jobs may be sorted according to the priorities set in the print jobs.

Figure 15:
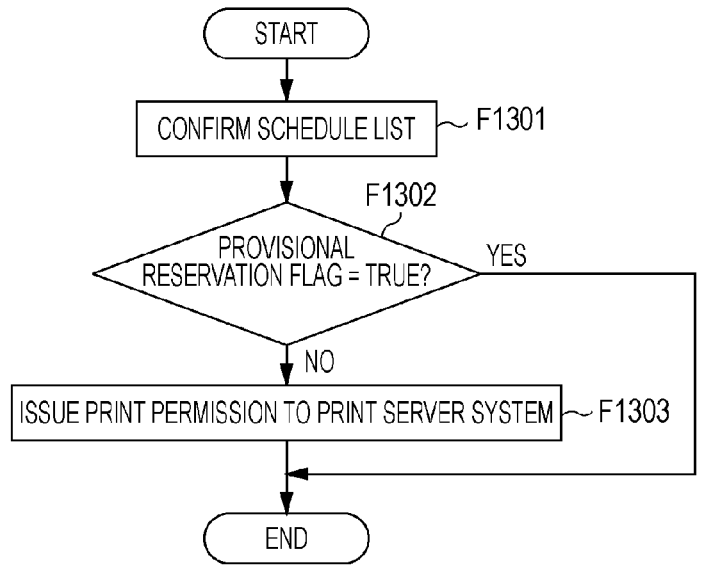
FIG. 15 is a flowchart showing an example of a process in which the job manager processes the schedule information in its print turn.

FIG. 15 is a flowchart showing an example of a process in which the job manager 702 processes the schedule information 800 in its print turn.

In Step F1301, the job manager 702 confirms the schedule list to acquire the schedule information 800 in its print turn. In Step F1302, the job manager 702 determines whether the provisional reservation flag 807 in the acquired schedule information 800 is set to "true. If the job manager 702 determines that the provisional reservation flag 807 in the schedule information 800 is set to "true" (YES in step F1302), the job manager 702 does not perform the subsequent step and does not perform the printing. If the job manager 702 determines that the provisional reservation flag 807 in the schedule information 800 is set to "false" (NO in step F1302), then in Step F1303, the job manager 702 issues a print permission to the print server system 101.

The job information 300 managed by the print server 201 is stored in the DBMS 104. Accordingly, the print server system 101 can refer to the DBMS 104 in response to the notification of the in-device job ID 801 from the job manager 702 to identify information about the document table 500. In other words, it is not necessary for the job manager 702 to specify the print server 201 to which the print permission is issued in Step F1303.

Referring back to FIG. 13, in Step S1107, the print server 201 receives the print permission. In Step S1108, the print server 201 notifies the schedule application 601 of start of transfer of the print data. In Step S1109, the print server 201 starts to transfer the print job to the device controller 610. The transfer of the print job is performed by the transfer method 404 set in the device information 400. The schedule application 601 receives the notification of start of the transfer and updates the status 806 in the schedule information 800 to "transferring".

In Step S1110, the device controller 610 sequentially analyzes the received print data and starts printing. In Step S1111, the device controller 610 updates the status of the print job managed by the device controller 610 to "printing" and notifies the schedule application 601 in which the event is registered that the printing is started.

The schedule application 601 receives the notification of the start of printing via the device manager 703. In Step S1112, the schedule application 601 notifies the print server 201 in which the event is registered that the printing is started. The print server 201 can determine the state of the print job of which the print server 201 has instructed the printing in the above manner.

When transfer of the print data is completed, then in Step S1113, the print server 201 notifies the schedule application 601 of termination of the transfer. The schedule application 601 receives the notification and updates the status 806 in the schedule information 800 about the print job to "transferred", as in the start of the transfer.

In Step S1114, the printing is terminated in the print device 106. In Step S1115, the device controller 610 notifies the schedule application 601 of the termination of printing, as in the start of the printing. The schedule application 601 receives the notification of the termination of printing and, in Step S1116, notifies the print server 201 of the termination of printing.

The print server 201 receives the notification of the termination of printing. When the print jobs corresponding to all the scheduled print requests are completed, then in Step S1117, the print server 201 clears the event in the schedule application 601. In Step S1118, the print server 201 submits a disconnection request to the schedule application 601.

After receiving the clearance of the event and the disconnection request, the schedule application 601 performs a process of terminating the communication with the print server 201.

In Step S1119, the session established between the print server 201 and the schedule application 601 in Step S1101 is terminated.

The print server 201 can perform the printing with the print device 106 via the schedule application 601 in the above manner.

The print job screen 901 in the pull print application 602 will now be described with reference to the drawings.

Figure 16:
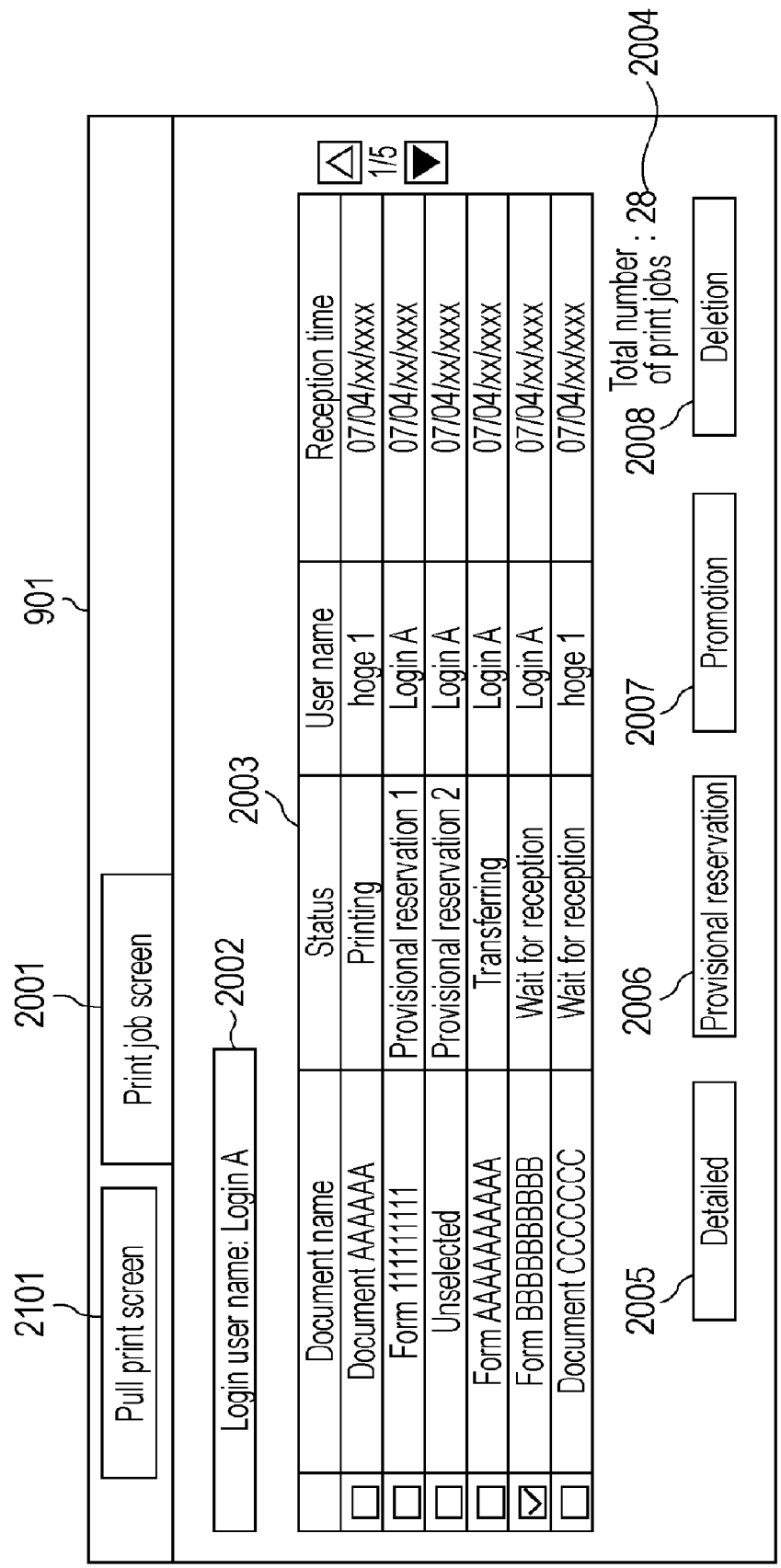
FIG. 16 shows an example of a print job screen in the pull print application.
Figure 17:
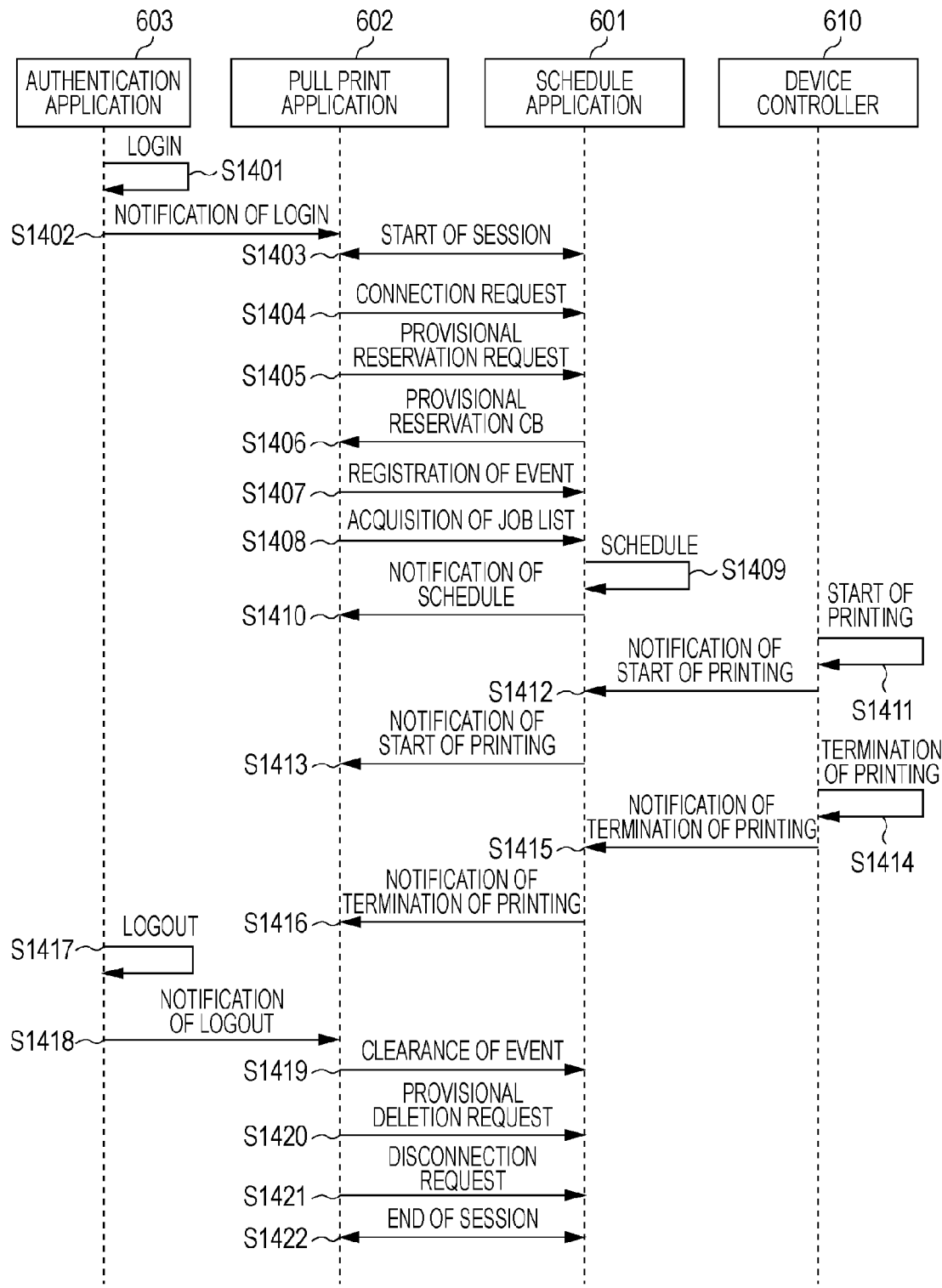
FIG. 17 shows an exemplary sequence concerning a process of creating items displayed in an exemplary screen.

FIG. 16 shows an example of the print job screen 901 in the pull print application 602. FIG. 17 shows an exemplary sequence concerning a process of creating items displayed in an exemplary screen. The print job screen 901 will now be described based on the sequence shown in FIG. 17. In the print job screen 901 shown in FIG. 16, reference numeral 2001 denotes a print job screen tag and reference numeral 2101 denotes a pull print screen tag. Selecting the print job screen tag 2001 and the pull print screen tag 2101 open the print job screen 901 and the pull print screen 902, respectively.

Referring to FIG. 17, in Step S1401, the authentication application 603 receives a login of a user with the IC card reader 618 and acquires the account of the user (the user ID). In Step S1402, the authentication application 603 notifies the pull print application 602 of the login. The pull print application 602 receives the login with the screen activation module 905 and generates the print job screen 901. At this time, the screen activation module 905 displays the acquired user name in a Login user name 2002 on the print job screen 901.

In Step S1403, the pull print application 602 starts a communication session with the schedule application 601. Although the communication session is established according to a communication protocol, such as the TCP/IP or the HTTP, the communication is performed by a loopback method in the present embodiment because the communication is performed in the virtual machine 605 in the same print device 106. In the communication performed by the loopback method, no communication data is externally transmitted.

In Step S1404, the pull print application 602 submits a connection request to the schedule application 601. The schedule application 601 receives the connection request with the communication manager 701.

In Step S1405, the pull print application 602 submits a provisional reservation request to the schedule application 601. The submission of the provisional reservation request by the pull print application 602 immediately after the user logs in allows the user to get an earlier print order.

A provisional reservation process performed by the schedule application 601 after the provisional reservation request is received before a provisional reservation callback (CB) is returned in Step S1406 will be described in detail below. The provisional reservation request may be submitted at any timing. For example, the provisional reservation request is submitted when a Provisional reservation button 2006 shown in FIG. 16 is pressed or when a form is selected.

In Step S1406, the pull print application 602 receives the provisional reservation CB. If the result of the provisional reservation CB is true, the pull print application 602 acquires a list of the in-device job IDs from the schedule application 601. If the result of the provisional reservation CB (Step S1406) is false, the pull print application 602 indicates that the provisional reservation cannot be performed on the print job screen 901 by, for example, pop-up display.

In Step S1407, the pull print application 602 registers an event in the schedule application 601 so that the pull print application 602 receives a notification if the status of the print job is varied.

In Step S1408, the pull print application 602 acquires a list (job list) of the schedule information 800 managed by the job manager 702 in the schedule application 601.

The pull print application 602 displays the acquired job list in a print job list 2003 on the print job screen 901. Since the acquired job list includes print jobs provisionally reserved, the user can view the print job screen 901 to confirm the order of the provisional reservation. Print jobs for which the provisional deletion flag 808 is set to "true" are determined to be deleted and are not displayed on the print job screen 901. The pull print application 602 displays the total number of acquired print jobs in a position denoted by reference numeral 2004. If the print jobs displayed in the total number of print jobs 2004 cannot be displayed in one page, the pull print application 602 performs paging as in the example shown in FIG. 16. In the screen shown in FIG. 16, the print job screen 901 includes five pages.

If a new print job from the print server 201 is scheduled in Step S1409, then in Step S1410, the schedule application 601 notifies the pull print application 602 of the schedule. Whether the schedule application 601 notifies the schedule is determined in a manner similar to the one in the schedule operation shown in FIG. 14. The pull print application 602 receives the notification and adds information about the new print job at the end of the print job list 2003 to update the print job screen 901.

When the device controller 610 updates the status of the print job in Step S1411 or Step S1414, the schedule application 601 performs the following processing. For example, in Step S1412 or Step S1415, the device controller 610 notifies the schedule application 601 of start or termination of printing. In Step S1413 or Step S1416, the schedule application 601 notifies the pull print application 602 in which the event is registered that the status is updated. The pull print application 602 receives the update of the status of the print job and updates the status of the corresponding print job in the print job list 2003 on the print job screen 901.

For example, when a Detailed button 2005 on the print job screen 901 is pressed, the pull print application 602 may display detailed information concerning the print job checked in the print job list 2003 on another screen.

In Step S1417, the authentication application 603 detects logout of the user through a hard key that is pressed. In Step S1418, the authentication application 603 notifies the pull print application 602 of the logout of the user. In Step S1419, the pull print application 602, which receives the notification of the logout, clears the event in the schedule application 601. In Step S1420, the pull print application 602 submits a provisional deletion request for the print job provisionally reserved by the user who has logged out. The steps after the provisional deletion request is submitted before the print job is deleted are similar to the ones when a Deletion button 2008 is pressed in selection of a provisionally reserved job. In Step S1421, the pull print application 602 sequentially submits a disconnection request to the schedule application 601. In Step S1422, the session established between the pull print application 602 and the schedule application 601 is terminated.

Processes performed when the Provisional reservation button 2006, a Promotion (change of the priority) button 2007, and the Deletion button 2008 on the print job screen 901 are pressed will be described below.

The pull print application 602 generates the print job screen 901 in the above manner.

Figure 18:
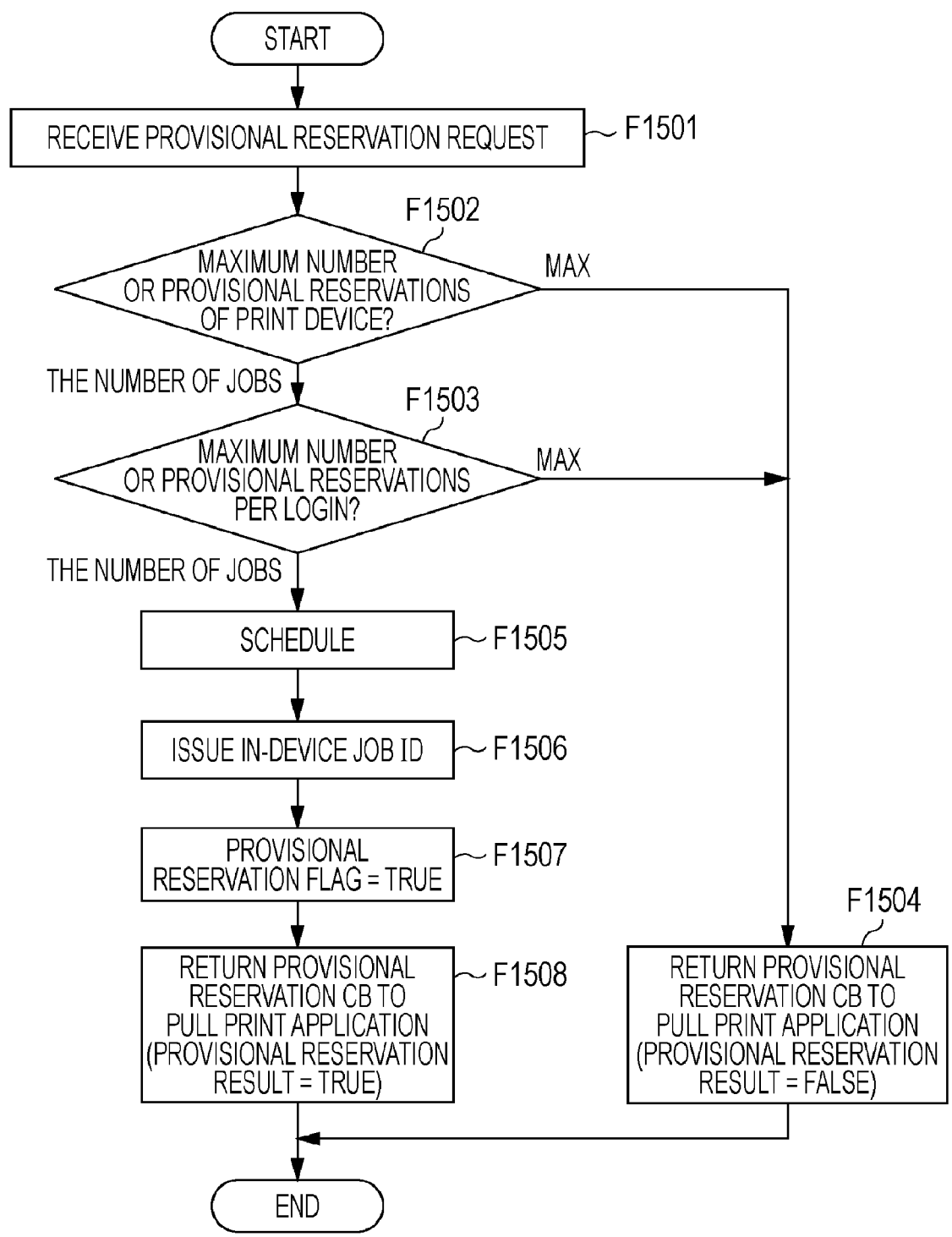
FIG. 18 is a flowchart showing an example of a process concerning provisional reservation.

The provisional reservation process performed after the schedule application 601 receives the provisional reservation request before the schedule application 601 returns the provisional reservation CB to the pull print application 602 is shown in FIG. 18. FIG. 18 is a flowchart showing an example of the process concerning the provisional reservation.

Referring to FIG. 18, in Step F1501, the schedule application 601 receives the provisional reservation request and calculates the number of jobs whose provisional reservation flag 807 is set to "true" in the schedule list managed by the schedule application 601. In Step F1502, the schedule application 601 compares the calculated number of jobs (the number of provisionally reserved jobs) with the maximum number of provisional reservations 1001 of the print device. If the number of provisionally reserved jobs equal to the maximum number of provisional reservations 1001 of the print device, then in Step F1504, the schedule application 601 determines that no more jobs can be provisionally reserved and returns a provisional reservation CB indicating that the result of the provisional reservation is "false" to the pull print application 602.

If the number of provisionally reserved jobs is smaller than the maximum number of provisional reservations 1001 of the print device, the schedule application 601 refers to the user name 803 of the provisionally reserved job to calculate the number of jobs that are provisionally reserved by the login user. In Step F1503, the schedule application 601 compares the calculated number of jobs (the number of jobs provisionally reserved by the login user) with the maximum number of provisional reservations per login 1002. If the number of jobs provisionally reserved by the login user is equal to the maximum number of provisional reservations per login 1002, the schedule application 601 determines that no more jobs can be reserved. In Step F1504, the schedule application 601 returns the provisional reservation CB indicating that the result of the provisional reservation is "false" to the pull print application 602.

If the number of jobs provisionally reserved by the login user is smaller than the maximum number of provisional reservations per login 1002, the schedule application 601 calculates the difference between the number of jobs provisionally reserved by the login user and the maximum number of provisional reservations per login 1002 to calculate the number of jobs that can be provisionally reserved. In Step F1505, the schedule application 601 performs scheduling of the jobs the number of which is calculated. In Step F1506, the schedule application 601 issues the in-device job ID. In Step F1507, the schedule application 601 sets the provisional reservation flag to "true". When the scheduling is completed, then in Step F1508, the schedule application 601 returns a provisional reservation CB indicating that the result of the provisional reservation is "true" to the pull print application 602.

The schedule application 601 generates the schedule information concerning the provisional reservation in the above manner.

Figure 19:
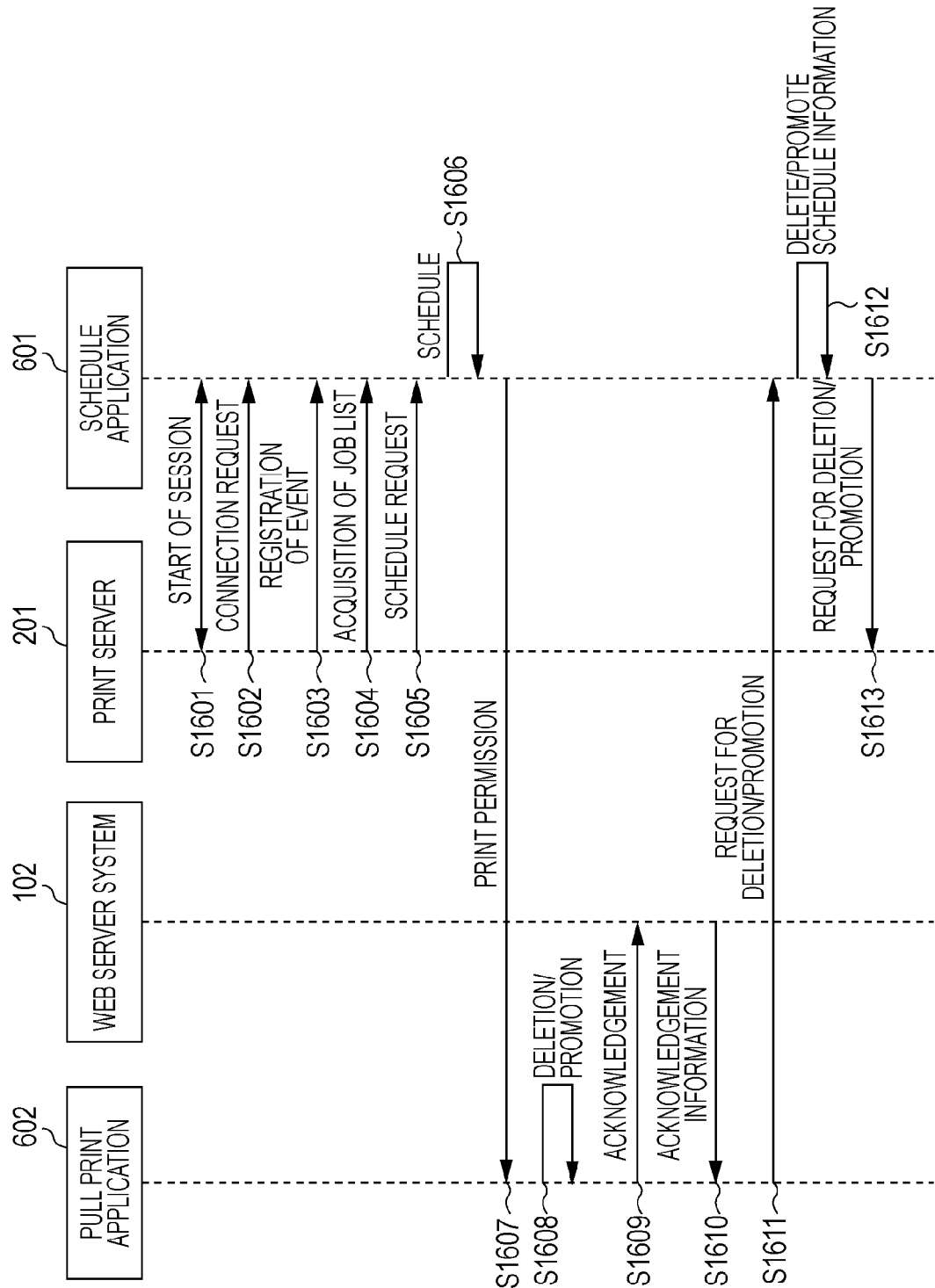
FIG. 19 shows an exemplary sequence of a process performed when a Promotion button or a Deletion button is pressed.

The process performed when the Promotion button 2007 or the Deletion button 2008 on the print job screen 901 is pressed will now be described with reference to FIG. 19. FIG. 19 shows an exemplary sequence of the process performed when the Promotion button 2007 or the Deletion button 2008 is pressed.

Steps S1601 to S1607 are similar to Steps S1101 to S1107 shown in FIG. 13. In Step S1608, the Promotion button 2007 is pressed or the Deletion button 2008 is pressed with a print job selected.

In Step S1609, the pull print application 602 requests the Web server system 102 to acknowledge deletion or promotion of a selected document. The Web server system 102 determines, for example, whether the deletion or promotion right is granted to the selected document and notifies the pull print application 602 of the determination result.

When the selected document is to be deleted, the Web server system 102 simply determines whether the deletion right is granted to the print job. When the selected document is to be promoted, the Web server system 102 determines whether the promotion right is granted to jobs that are scheduled before the print job to be promoted and promotes the print job to the highest order to which the job can be promoted. Depending on settings, the Web server system 102 may promote the print job only if the promotion right is granted to all the jobs that are scheduled before the print job to be promoted and may fail to promote the print job otherwise.

In Step S1610, the pull print application 602 receives acknowledgement information from the Web server system 102. When the deletion or promotion right is acknowledged, then in Step S1611, the pull print application 602 requests the schedule application 601 to delete or promote the print job. A deletion process when the provisional reservation flag 807 is set to "true" will be described below. In Step S1612, the schedule application 601, which has received the deletion or promotion request (Step S1611), deletes or promotes the schedule information 800. In Step S1613, the schedule application 601 requests the print server 201 to delete or promote the job. The print server 201 updates the job information 300 or deletes the document table 500.

Figure 20:
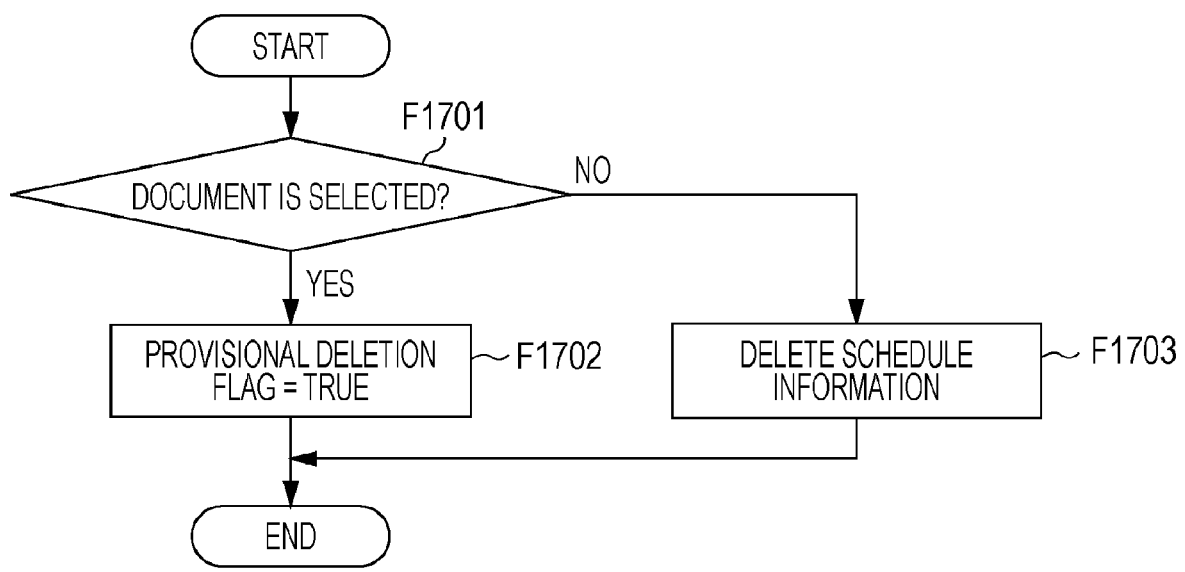
FIG. 20 is a flowchart showing an example of a deletion process of a provisionally reserved job.

The process performed by the schedule application 601 when the provisional reservation flag 807 of the job to which the deletion request is submitted (Step S1611) is set to "true", which is shown in FIG. 20. FIG. 20 is a flowchart showing an example of the deletion process of a provisionally reserved job.

Referring to FIG. 20, in Step F1701, the schedule application 601 refers to the document ID 805 or the document name 802 in the schedule information 800 to be deleted to determine whether the document is selected. If the schedule application 601 determines that the document is selected, then in Step F1702, the schedule application 601 updates the provisional deletion flag 808 to "true". Updating the provisional deletion flag 808 to "true" causes the job in its turn to be deleted in Steps F1204, F1206, and F1207.

If the document is not selected in Step F1701 (NO in step F1701), then in Step F1703, the schedule application 601 deletes the schedule information 800 to be deleted. Since no print instruction is issued to the Web server system 102 when the document is not selected, it is not necessary to delete the job.

The pull print screen 902 in the pull print application 602 will now be described with reference to the drawings.

Figure 21:
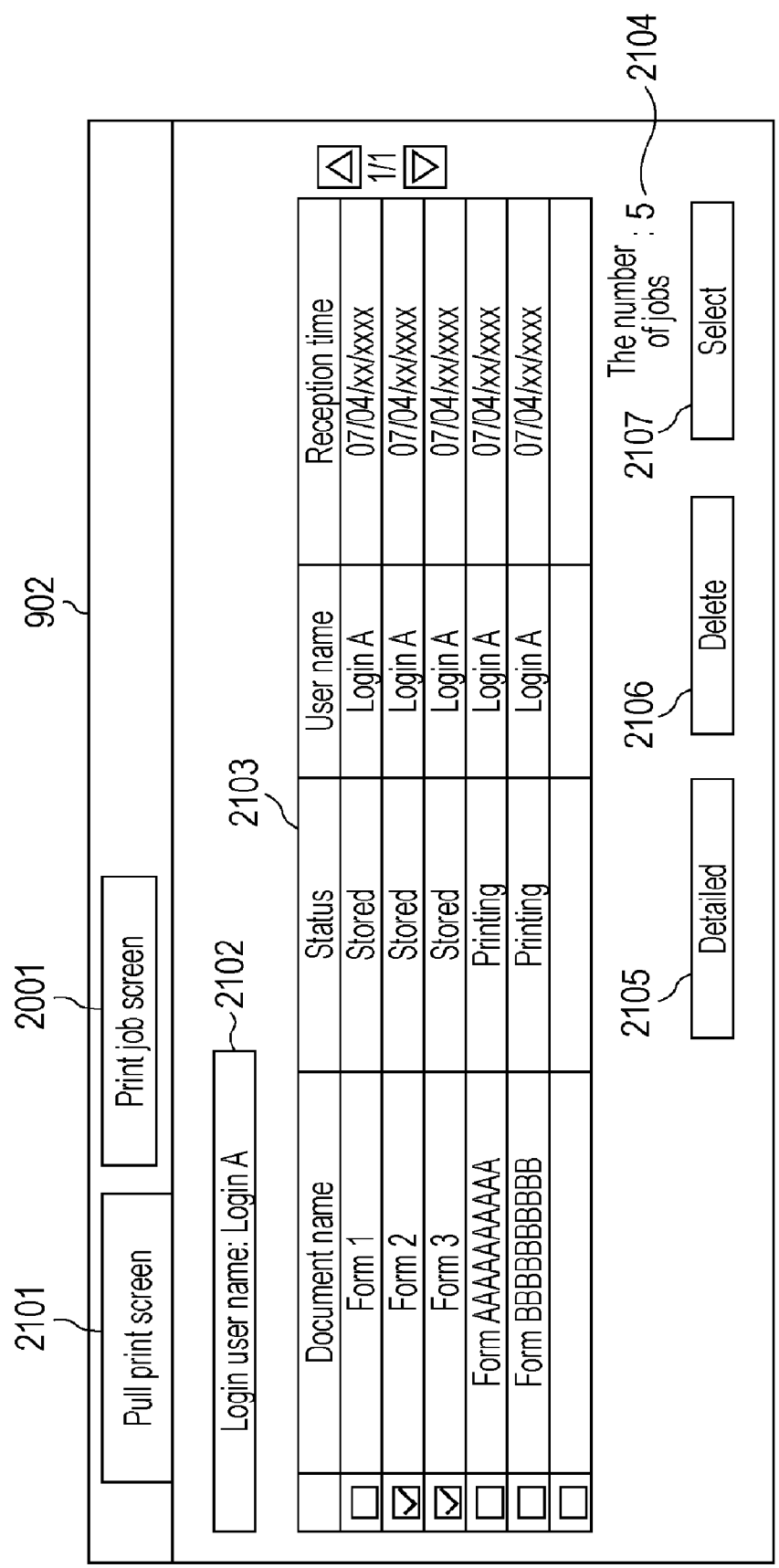
FIG. 21 shows an example of a pull print screen in the pull print application.
Figure 22:
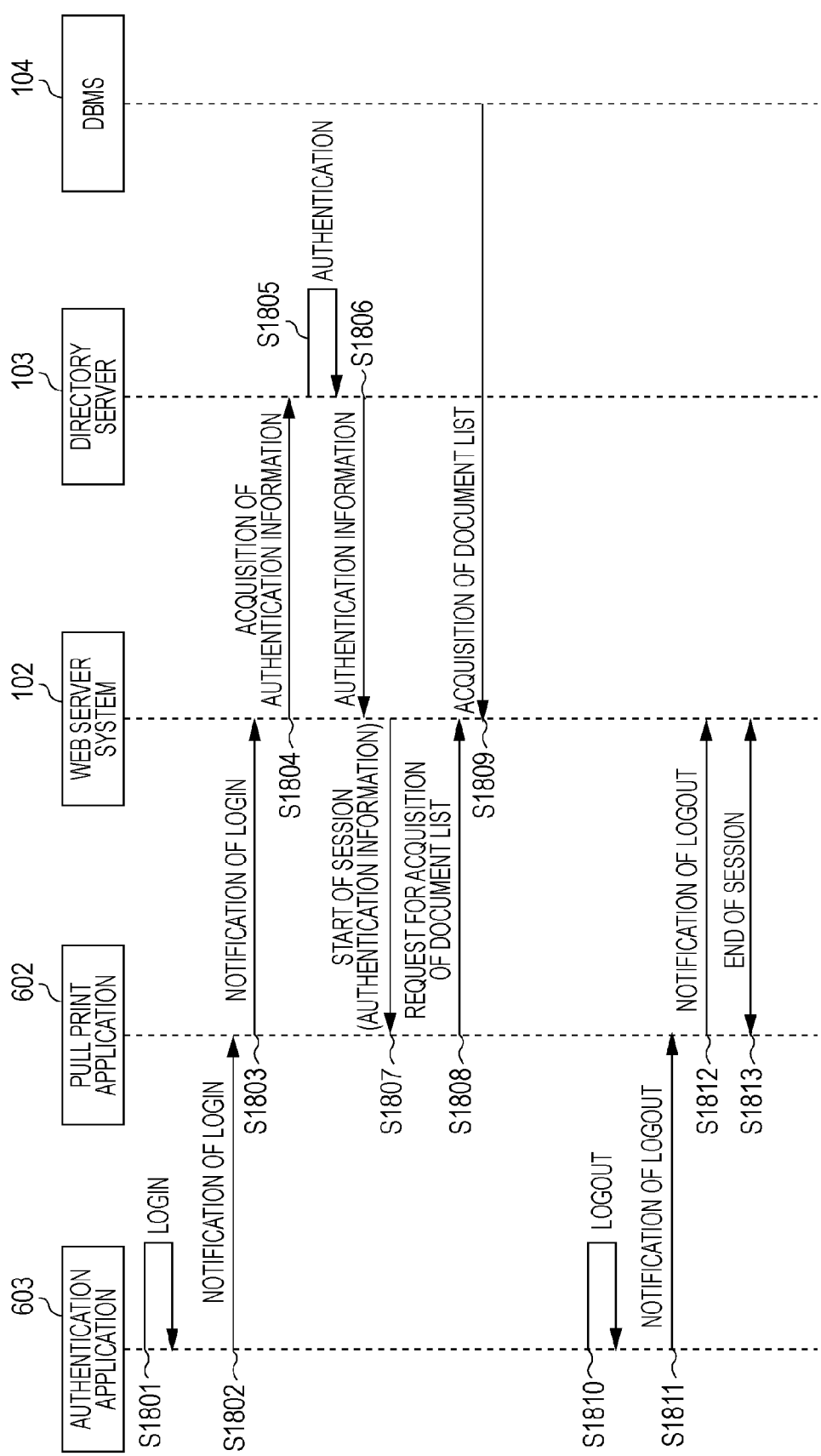
FIG. 22 shows an exemplary sequence concerning a process of creating items displayed in an exemplary screen.

FIG. 21 shows an example of the pull print screen 902 in the pull print application 602. FIG. 22 shows an exemplary sequence concerning a process of creating items displayed in an exemplary screen. The pull print screen 902 will now be described on the basis of the sequence shown in FIG. 22.

In Step S1801, the authentication application 603 receives a login with the IC card reader 618 and acquires a user account (user ID). In Step S1802, the authentication application 603 notifies the pull print application 602 of the login. The pull print application 602 receives the login with the screen activation module 905 and generates the pull print screen 902. The screen activation module 905 displays the acquired user name in a Login user name 2102 on the pull print screen 902.

In Step S1803, the pull print application 602 notifies the Web server system 102 of the login. In the notification, the user account (user ID) acquired from the authentication application 603 is used as the login information. An authentication method using a password may be used for improvement of the security. In this case, the password may be managed in the authentication application 603 in combination with the user ID. In addition, the user ID and the password may be input on the pull print screen 902, instead of the use of the IC card reader 618.

Upon reception of the notification of the login from the pull print application 602, in Step S1804, the Web server system 102 acquires authentication information from the directory server 103. In Step S1805, the directory server 103 refers to the user information that is registered in advance to perform the authentication. If the authentication succeeds, then in Step S1806, the directory server 103 returns user information and information about the domain group to which the user belongs as the authentication information. If the authentication fails, the directory server 103 returns the failure and the login fails.

Upon reception of the authentication information from the directory server 103, in Step S1807, the Web server system 102 notifies the pull print application 602 of start of a session. The Web server system 102 transmits the acquired authentication information as the notification information. In Step S1808, the pull print application 602 requests the Web server system 102 to acquire a document list on the basis of the acquired authentication information. In the request, the pull print application 602 can set refinement conditions. For example, the pull print application 602 may request the Web server system 102 to acquire only the list of documents registered with the user ID or may request the Web server system 102 to acquire the list of documents in all the domain groups to which the user belongs. According to the present embodiment, the case where the list of documents registered with the user ID is acquired is described.

Upon reception of the request to acquire a document list, in Step S1809, the Web server system 102 acquires the list of documents having the corresponding user ID from the DBMS 104 and transmits the document list to the pull print application 602.

The pull print application 602 acquires the document list and displays the acquired document list in a document list 2103 on the pull print screen 902. In this case, the pull print application 602 displays the total number of acquired documents in a number of jobs 2104 and performs the paging if the documents of the number displayed in the number of jobs 2104 cannot be displayed in one page. In the example shown in FIG. 21, the documents are displayed in one page.

The pull print application 602 may have a function of displaying detailed information about the documents checked in the document list 2103 in another screen when a Detailed button 2105 on the pull print screen 902 is pressed.

When a Delete button 2106 on the pull print screen 902 is pressed, the pull print application 602 requests the Web server system 102 to delete the documents. Upon reception of the request to delete the documents, the Web server system 102 deletes the corresponding documents from the DBMS 104.

In Step S1810, the authentication application 603 detects logout of the user, for example, through a hard key that is pressed. In Step S1811, the authentication application 603 notifies the pull print application 602 of the logout of the user. Upon reception of the notification of the logout, in Step S1812, the pull print application 602 notifies the Web server system 102 of the logout. In Step S1813, the session is terminated.

A process performed when a Select button 2107 on the pull print screen 902 is pressed will be described below.

The pull print application 602 generates the pull print screen 902 in the above manner.

Figure 23:
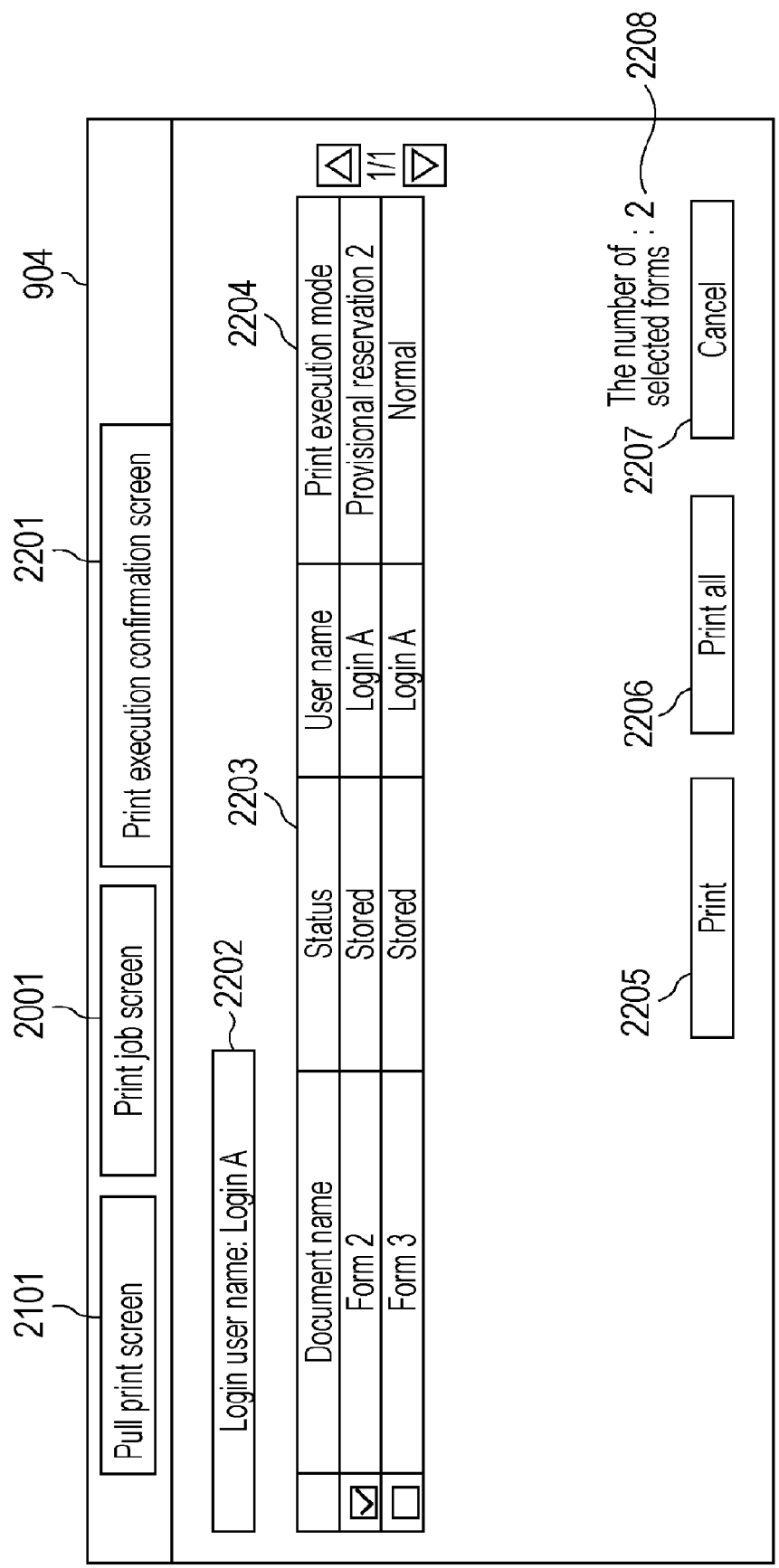
FIG. 23 shows an example of a print execution confirmation screen in the pull print application.

FIG. 23 shows an example of the print execution confirmation screen 904 in the pull print application 602. A login user name is displayed in a Login user name 2202. Reference numeral 2201 denotes a print execution confirmation screen tag. Selecting the print execution confirmation screen tag 2201 opens the print execution confirmation screen 904.

The process performed when the Select button 2107 on the pull print screen 902 is pressed will now be described. When the Select button 2107 is pressed, the pull print application 602 generates the print execution confirmation screen 904 and displays a list of checked documents in a document list 2203. The pull print application 602 confirms whether the provisional reservation acquired by the login user exists. If a provisionally reserved print job to which no document is allocated exists, the pull print application 602 allocates the checked documents as the provisionally reserved print jobs and displays the number of documents in a number of selected forms 2208. If the provisionally reserved print job to which no document is allocated does not exist, the pull print application 602 processes the print job as a normal pull print job for which the provisional reservation is not performed. In selection of multiple documents, the pull print application 602 sequentially allocates the documents to the provisionally reserved print jobs and processes the print jobs as the normal pull print jobs when no more provisionally reserved print job to which no document is allocated exits. The pull print application 602 displays how the selected documents are processed in a Print execution mode 2204.

In the allocation of the documents to the provisionally reserved print jobs, for example, the user may determine whether each job is allocated to the provisionally reserved print job or the jobs allocated to the provisionally reserved print jobs may be processed separately from the jobs that are not allocated to the provisionally reserved print jobs.

When a Cancel button 2207 is pressed, the printing is not performed and the print execution confirmation screen 904 is discarded.

When a Print button 2205 or a Print all button 2206 are pressed, the following process is performed.

Figure 24:
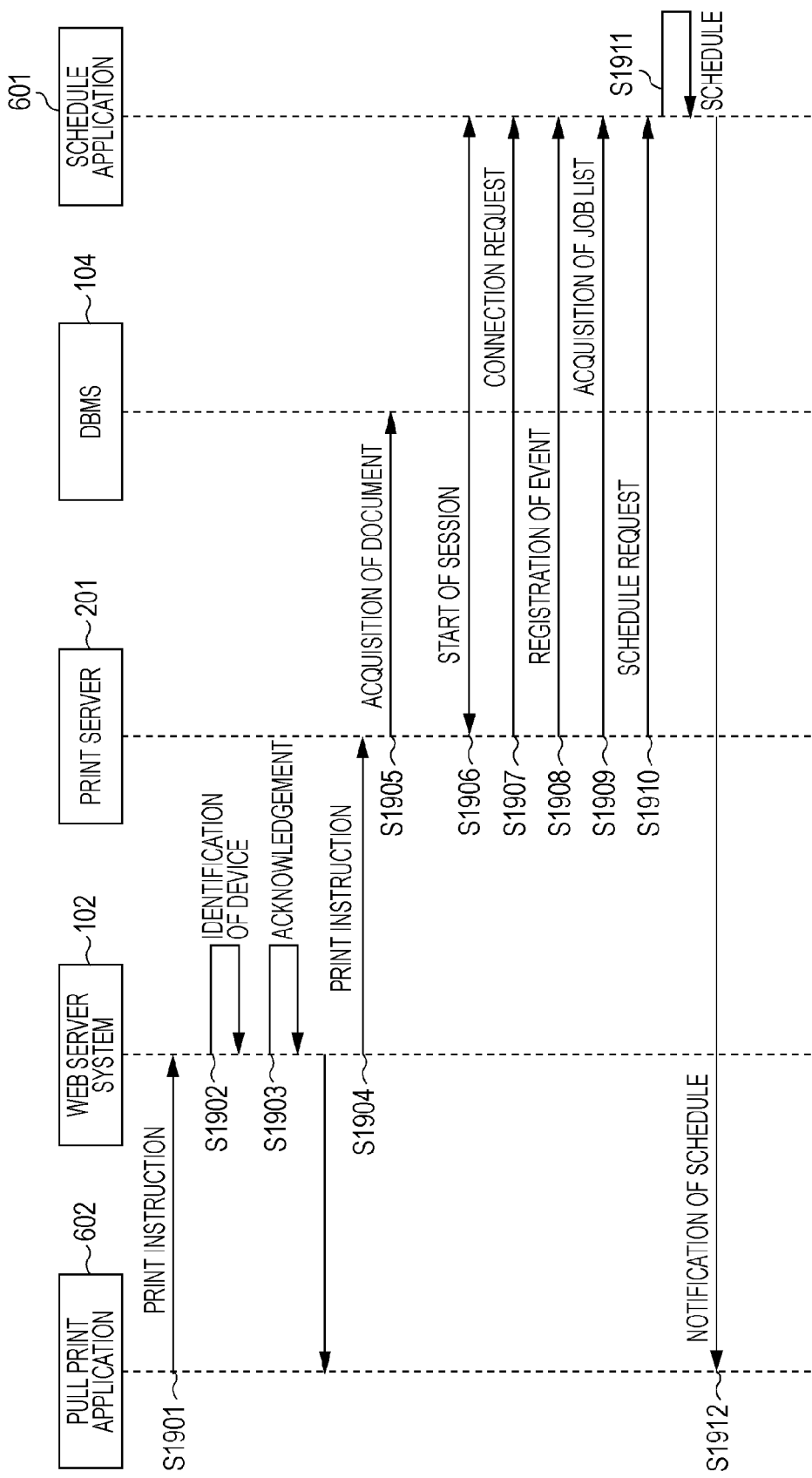
FIG. 24 shows an exemplary sequence concerning a process performed when a Print button on the print execution confirmation screen is pressed.

The process performed when the Print button 2205 on the print execution confirmation screen 904 is pressed will now be described with reference to FIG. 24. FIG. 24 shows an exemplary sequence concerning the process performed when the Print button 2205 on the print execution confirmation screen 904 is pressed.

When the Print button 2205 is pressed, the pull print application 602 acquires the document ID of a checked document. In Step S1901, the pull print application 602 issues a print instruction to the Web server system 102. The print instruction includes the acquired document ID, information about the print device 106 in which the pull print application 602 is installed, and the in-device job ID acquired from the provisional reservation CB from the schedule application 601. Since no in-device job ID is issued for the pull print job that is not provisionally reserved, the print instruction is transmitted in an empty state. The information about the print device 106 includes address information or device information about the print device 106.

In Step S1902, the Web server system 102 identifies the print device 106. The Web server system 102 performs the identification by using the device information 400 managed in the DBMS 104 or the print server 201 on the basis of the transmitted information about the print device 106.

In Step S1903, the Web server system 102 acknowledges whether the user who has issued the print instruction has the print right of the specified document. If the acknowledgement fails, the Web server system 102 notifies the pull print application 602 that the document cannot be printed.

If the acknowledgement succeeds, in Step S1904, the Web server system 102 issues a print instruction to the print server 201. The device information 400 about the specified print device 106, the document ID, and the in-device job ID are indicated to the print server 201 as the print instruction, and the DBMS 104 registers the in-device job ID.

Upon reception of the print instruction, in Step S1905 to Step S1910, the print server 201 performs the printing in accordance with the sequence shown in FIG. 13.

In Step S1911, the schedule application 601 performs the schedule operation. In Step S1912, the schedule application 601 notifies the pull print application 602 of the schedule information. Upon reception of the notification, the pull print application 602 updates the print job list 2003 on the print job screen 901.

The printing is performed with the print execution confirmation screen 904 in the above manner.

When the Print all button 2206 is pressed, all the documents displayed in the document list 2203 are processed. The content of the processing is similar to the one when the Print button 2205 is pressed.

Other Embodiments

The present invention can be embodied by supplying a storage medium (or a recording medium) storing software program code realizing the functions according to the above embodiments to a system or an apparatus, the CPU or a micro processing unit (MPU) in which system or apparatus reads out and executes the program code stored in the storage medium. In this case, the present invention is embodied by the program code itself read out from the storage medium. The present invention is applicable to the storage medium storing the program code.

The operating system (OS) or the like running on the system or apparatus may execute all or part of the actual processing on the basis of instructions in the program code read out by the CPU of the system or the apparatus to realize the functions of the embodiments described above.

Alternatively, after the program code read out from the storage medium has been written in a memory that is provided in a function expansion board included in the system or apparatus or in a function expansion unit connected to the system or apparatus, the CPU or the like in the function expansion board or the function expansion unit may execute all or part of the actual processing on the basis of instructions in the program code to realize the functions of the embodiments described above.

When the present invention is applied to the storage medium, the program code corresponding to the flowcharts described above is stored in the storage medium.

According to the embodiments of the present invention described above, it is possible to perform the printing in a specified order without being interrupted by another job while a job concerning the pull print is being processed.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-249721 filed Sep. 26, 2007, which is hereby incorporated by reference herein in its entirety.

What is claimed is:

1. An image processing apparatus comprising:
a print-request controlling unit configured to request a server with which the image processing apparatus can communicate over a network to print a document stored in an apparatus with which the image processing apparatus can communicate over a network; and
a print-reservation executing unit configured to execute reservation of a print job in response to a request to execute the reservation of the print job transmitted from the server,
wherein the print-request controlling unit requests the print-reservation executing unit to execute provisional reservation of a print job and requests the server to print the document if a result of the provisional reservation in response to the request received from the print-reservation executing unit indicates that the print job has been provisionally reserved,
wherein the print-reservation executing unit receives the request to execute the provisional reservation from the print-request controlling unit, provisionally reserves the print job in response to the received request to execute the provisional reservation, and notifies the print-request controlling unit of the result of the provisional reservation indicating that the print job has been provisionally reserved when the print job is provisionally reserved, and
wherein, if the print job for which the request to execute the reservation submitted from the server is the provisionally-reserved print job, the print-reservation executing unit updates a state of the print job from provisional reservation to reservation, and the image processing apparatus executes, in an order of receipt of the request to execute the reservation from the server and the request to execute the provisional reservation from the print-request controlling unit, each print job corresponding to each received request.

2. The image processing apparatus according to claim 1, wherein, if the print job for which the request to execute the reservation is submitted from the server is not the provisionally-reserved print job, the print-reservation executing unit executes the reservation of the print job.

3. The image processing apparatus according to claim 1, further comprising:
an authentication unit configured to authenticate a user,
wherein the print-request controlling unit requests the print-reservation executing unit to execute the provisional reservation of the print job when the print-request controlling unit receives a login notification indicating that the user has logged in from the authentication unit.

4. The image processing apparatus according to claim 1, further comprising:
an authentication unit configured to authenticate a user,
wherein the print-request controlling unit requests the print-reservation executing unit to delete the provisional reservation of the print job when the print-request controlling unit receives a logout notification indicating that the user has logged out from the authentication unit, and
wherein the print-reservation executing unit receives the request to delete the provisional reservation from the print-request controlling unit and deletes the provisional reservation of the print job in response to the received request to delete the provisional reservation.

5. The image processing apparatus according to claim 1, wherein the print-reservation executing unit compares a number of provisional reservations that have been executed with an allowable number of provisional reservations that is set for the image processing apparatus to execute the provisional reservation of the print job in response to the request to execute the provisional reservation if the number of provisional reservations is smaller than the allowable number of provisional reservations.

6. The image processing apparatus according to claim 1, wherein the print-reservation executing unit compares a number of provisional reservations that have been executed by a login user with an allowable number of provisional reservations per login user to execute the provisional reservation of the print job in response to the request to execute the provisional reservation if the number of provisional reservations is smaller than the allowable number of provisional reservations per login user.

7. A method for controlling provisional reservation of a print job in an image processing apparatus including a print-request controlling unit and a print-reservation executing unit, the method comprising:
the print-request controlling unit requesting a server, with which the image processing apparatus can communicate over a network, to print a document stored in an apparatus, with which the image processing apparatus can communicate over a network; and
the print-reservation executing unit executing reservation of a print job in response to a request to execute the reservation of the print job transmitted from the server,
wherein the print-request controlling unit further requests the print-reservation executing unit to execute provisional reservation of a print job and requests the server to print the document if a result of the provisional reservation in response to the request received from the print-reservation executing unit indicates that the print job has been provisionally reserved,
wherein the print-reservation executing unit receives the request to execute the provisional reservation from the print-request controlling unit, provisionally reserves the print job in response to the received request to execute the provisional reservation, and notifies the print-request controlling unit of the result of the provisional reservation indicating that the print job has been provisionally reserved when the print job is provisionally reserved, and
wherein, if the print job for which the request to execute the reservation submitted from the server is the provisionally-reserved print job, the print-reservation executing unit updates a state of the print job from provisional reservation to reservation, and the image processing apparatus executes, in an order of receipt of the request to execute the reservation from the server and the request to execute the provisional reservation from the print-request controlling unit, each print job corresponding to each received request.

8. The method according to claim 7, wherein, if the print job for which the request to execute the reservation is submitted from the server is not the provisionally-reserved print job, the print-reservation executing unit executes the reservation of the print job.

9. The method according to claim 7, wherein the requesting requests the print-reservation executing unit to execute the provisional reservation of the print job when a login notification indicating that a user has logged in is received from an authentication unit authenticating the user.

10. The method according to claim 7,
wherein the requesting requests the print-reservation executing unit to delete the provisional reservation of the print job when a logout notification indicating that a user has logged out is received from an authentication unit authenticating the user, and
wherein the executing receives the request to delete the provisional reservation from the print-request controlling unit and deletes the provisional reservation of the print job in response to the received request to delete the provisional reservation.

11. The method according to claim 7, wherein the executing compares a number of provisional reservations that have been executed with an allowable number of provisional reservations that is set for the image processing apparatus to execute the provisional reservation of the print job in response to the request to execute the provisional reservation if the number of provisional reservations is smaller than the allowable number of provisional reservations.

12. The method according to claim 7, wherein the executing compares a number of provisional reservations that have been executed by a login user with an allowable number of provisional reservations per login user to execute the provisional reservation of the print job in response to the request to execute the provisional reservation if the number of provisional reservations is smaller than the allowable number of provisional reservations per login user.

13. A non-transitory computer-readable storage medium encoded with computer-executable instructions for executing a method for controlling provisional reservation of a print job in an image processing apparatus including a print-request controlling unit and a print-reservation executing unit, the method comprising:
requesting a server with which the image processing apparatus can communicate over a network to print a document stored in an apparatus with which the image processing apparatus can communicate over a network; and executing reservation of a print job in response to a request to execute the reservation of the print job transmitted from the server, wherein the print-request controlling unit further requests the print-reservation executing unit to execute provisional reservation of a print job and requests the server to print the document if a result of the provisional reservation in response to the request received from the print-reservation executing unit indicates that the print job has been provisionally reserved, wherein the print-reservation executing unit receives the request to execute the provisional reservation from the print-request controlling unit, provisionally reserves the print job in response to the received request to execute the provisional reservation, and notifies the print-request controlling unit of the result of the provisional reservation indicating that the print job has been provisionally reserved when the print job is provisionally reserved, and wherein, if the print job for which the request to execute the reservation submitted from the server is the provisionally-reserved print job, the print-reservation executing unit updates a state of the print job from provisional reservation to reservation, and the image processing apparatus executes, in an order of receipt of the request to execute the reservation from the server and the request to execute the provisional reservation from the print-request controlling unit, each print job corresponding to each received request.

* * * * *